US012239129B2

(12) United States Patent
Gross et al.

(10) Patent No.: US 12,239,129 B2
(45) Date of Patent: *Mar. 4, 2025

(54) FAST-ACTING ANTIMICROBIAL SURFACES, AND METHODS OF MAKING AND USING THE SAME

(71) Applicant: HRL Laboratories, LLC, Malibu, CA (US)

(72) Inventors: Adam Gross, Santa Monica, CA (US); Andrew Nowak, Los Angeles, CA (US); Ashley Dustin, Santa Monica, CA (US); Jason Graetz, Calabasas, CA (US); John Vajo, West Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 17/713,356

(22) Filed: Apr. 5, 2022

(65) Prior Publication Data

US 2022/0225608 A1 Jul. 21, 2022

Related U.S. Application Data

(63) Continuation of application No. 17/090,968, filed on Nov. 6, 2020, now Pat. No. 11,369,109.

(60) Provisional application No. 63/037,921, filed on Jun. 11, 2020.

(51) Int. Cl.
| | | |
|---|---|---|
| *A01N 25/10* | (2006.01) | |
| *A01N 33/12* | (2006.01) | |
| *A01P 1/00* | (2006.01) | |
| *C09D 5/14* | (2006.01) | |

(52) U.S. Cl.
CPC ............ *A01N 25/10* (2013.01); *A01N 33/12* (2013.01); *A01P 1/00* (2021.08); *C09D 5/14* (2013.01)

(58) Field of Classification Search
CPC ........... A01N 25/10; A01N 33/12; A01P 1/00; C09D 5/14
See application file for complete search history.

(56) References Cited

U.S. PATENT DOCUMENTS

| | | |
|---|---|---|
| 3,435,003 A | 3/1969 | Craven |
| 3,810,874 A | 5/1974 | Mitsch et al. |
| 3,847,978 A | 11/1974 | Sianesi et al. |
| 4,777,224 A | 10/1988 | Gorzynski et al. |
| 4,956,438 A | 9/1990 | Ruetman et al. |
| 5,032,666 A | 7/1991 | Hu et al. |
| 5,084,315 A | 1/1992 | Karimi et al. |
| 5,189,135 A | 2/1993 | Cozzi et al. |
| 5,290,418 A | 3/1994 | Menchen et al. |
| 5,332,798 A | 7/1994 | Ferreri et al. |
| 5,589,552 A | 12/1996 | Simeone et al. |
| 5,798,415 A | 8/1998 | Corpart et al. |
| 6,071,564 A | 6/2000 | Marchetti et al. |
| 6,183,872 B1 | 2/2001 | Tanaka et al. |
| 6,579,835 B2 | 6/2003 | Scicchitano et al. |
| 6,926,937 B2 | 8/2005 | Extrand et al. |
| 6,992,132 B2 | 1/2006 | Trombetta et al. |
| 7,655,310 B2 | 2/2010 | Trombetta |
| 9,136,562 B2 | 9/2015 | Singh et al. |
| 9,226,508 B2 | 1/2016 | Uhlmann et al. |
| 9,625,410 B1 * | 4/2017 | Hicks-Garner ...... G01N 33/227 |
| 2002/0016267 A1 | 2/2002 | Scicchitano et al. |
| 2003/0229176 A1 | 12/2003 | Trombetta et al. |
| 2004/0019143 A1 | 1/2004 | Koloski et al. |
| 2005/0164010 A1 | 7/2005 | Trombetta |
| 2006/0189750 A1 | 8/2006 | Maier et al. |
| 2007/0298216 A1 | 12/2007 | Jing et al. |
| 2008/0219944 A1 | 9/2008 | Longo et al. |

(Continued)

FOREIGN PATENT DOCUMENTS

| | | |
|---|---|---|
| EP | 1558661 B1 | 12/2012 |
| WO | 1997035919 A1 | 10/1997 |
| WO | 2013158360 A1 | 10/2013 |

OTHER PUBLICATIONS

Rubinsky, L., Germicide wound pad with active, in situ, electrolytically produced hypochlorous acid, 2016, Biomed Microdevices, vol. 18, Ed. 26, pp. 1-10. (Year: 2016).*

Huthwelker, T., Solubility of HOCl in Water and Aqueous H2SO4 to Stratospheric Temperatures, 1995, Journal of Atmospheric Chemistry, vol. 21, pp. 81-95. (Year: 1995).*

Demir, B., N-Halamine Biocidal Materials with Superior Antimicrobial Efficacies for Wound Dressing, 2107, Molecules, vol. 22, pp. 1-17 (Year: 2017).*

Ashish Vaidya and Manoj K. Chaudhury, "Synthesis and Surface Properties of Environmentally Responsive Segmented Polyurethanes," Journal of Colloid and Interface Science 249, 235-245 (2002).

(Continued)

*Primary Examiner* — Scarlett Y Goon
*Assistant Examiner* — Andriae M Holt
(74) *Attorney, Agent, or Firm* — O'Connor & Company; Ryan P. O'Connor

(57) ABSTRACT

An antimicrobial coating is disclosed that provides fast transport rates of biocides for better effectiveness to deactivate SARS-CoV-2 and other viruses or bacteria on common surfaces. Some variations provide an antimicrobial structure comprising: a solid structural phase comprising a solid structural material; a continuous transport phase that is interspersed within the solid structural phase, wherein the continuous transport phase comprises a solid transport material; and an antimicrobial agent contained within the continuous transport phase, wherein the solid structural phase and the continuous transport phase are separated by an average phase-separation length from about 100 nanometers to about 500 microns. The antimicrobial structure is capable of destroying at least 99.99% of bacteria and/or viruses in 10 minutes of contact. Many options are disclosed for suitable materials to form the solid structural phase, the continuous transport phase, and the antimicrobial agent.

42 Claims, 5 Drawing Sheets

(56) References Cited

U.S. PATENT DOCUMENTS

| | | | |
|---|---|---|---|
| 2010/0106103 A1* | 4/2010 | Ziebol | A61M 25/0105 604/265 |
| 2010/0324205 A1 | 12/2010 | Maier et al. | |
| 2011/0177987 A1 | 7/2011 | Lenting et al. | |
| 2011/0218290 A1 | 9/2011 | Webster et al. | |
| 2011/0229750 A1 | 9/2011 | McLellan et al. | |
| 2011/0213085 A1 | 11/2011 | Tonelli et al. | |
| 2012/0136120 A1 | 5/2012 | Bosman | |
| 2012/0164565 A1 | 6/2012 | Qiu | |
| 2014/0113144 A1 | 4/2014 | Loth et al. | |
| 2014/0127516 A1 | 5/2014 | Wang et al. | |
| 2014/0162022 A1 | 6/2014 | Nowak et al. | |
| 2015/0158969 A1 | 6/2015 | Nowak | |
| 2015/0329453 A1 | 11/2015 | Guarda et al. | |
| 2016/0028114 A1 | 1/2016 | Pratt et al. | |
| 2016/0201005 A1 | 7/2016 | Nowak et al. | |
| 2017/0174911 A1 | 6/2017 | Nowak et al. | |
| 2017/0208798 A1* | 7/2017 | Chaudhary | A61Q 17/005 |
| 2019/0048223 A1* | 2/2019 | Dustin | C09D 171/02 |
| 2019/0106525 A1 | 4/2019 | Becker et al. | |
| 2020/0009611 A1* | 1/2020 | Voskian | A01N 59/16 |

OTHER PUBLICATIONS

Siochi et al., "Engineered Surfaces for Mitigation of Insect Residue Adhesion" NF1676L-15481 Sampe 2013; May 6-9, 2013; Long Beach, CA; United States.

Wohl et al., "Evaluation of commercially available materials to mitigate insect residue adhesion on wing leading edge surfaces," Progress in Organic Coatings 76 (2013) 42-50.

Kok et al., "Influence of surface characteristics on insect residue adhesion to aircraft leading edge surfaces," Progress in Organic Coatings 76 (2013) 1567-1575.

Lee et al., "Zwitter-Wettability and Antifogging Coatings with Frost-Resisting Capabilities," ACS Nano 7 (2013) 2172-2185.

Chen et al., "Robust Prototypical Anti-icing Coatings with a Self-lubricating Liquid Water Layer between Ice and Substrate," ACS Appl. Mater. Interfaces 5 (2013) 4026-4030.

Turri et al., "Waterborne Anionomeric Polyurethane-Ureas from Functionalized Fluoropolyethers," Journal of Applied Polymer Science, vol. 93, 136-144 (2004).

Dou et al., "Anti-icing Coating with an Aqueous Lubricating Layer," ACS Appl. Mater. Interfaces 2014, 6, 6998-7003.

Wang et al., "Investigation of the role of hydrophilic chain length in amphiphilic perfluoropolyether/poly(ethylene glycol) networks: towards high-performance antifouling coatings," Biofouling vol. 27, No. 10, Nov. 2011, 1139-1150.

Chen et al., "A Thermally Re-mendable Cross-Linked Polymeric Material," Science 295 (5560), 1698-1702, Mar. 1, 2002.

Oster et al., "Photoreduction of Metal Ions by Visible Light," Departmenotf Chemistry, Polytechnic Institute of Brooklyn, 135th National meeting of the American Chemical Society, Nov. 5, 1959.

Wojtecki et al., "Using the dynamic bond to access macroscopically responsive structurally dynamic polymers," Nature Materials vol. 10, Jan. 2011.

Chen et al., "Icephobic Surfaces Induced by Interfacial Nonfrozen Water" ACS Appl. Mater. Interfaces 2017, 9, 4202-4214.

Chernyy et al., "Superhydrophilic Polyelectrolyte Brush Layers with Imparted Anti-Icing Properties: Effect of Counter ons" ACS Appl. Mater. Interfaces 2014, 6, 6487-6496.

Ryerson, "Assessment of Superstructure Ice Protection as Applied to Offshore Oil Operations Safety" US Army Research, 49, 2009.

Lauten et al., "Efficacies of Novel N-Halamine Disinfectants against Salmonella and Pseudomonas Species", Applied and Environmental Microbiology, Apr. 1992, p. 1240-1243.

Bonino et al., "Electrochemical properties of copper-based polymer electrolytes", Electrochimica Acta vol. 37, Issue 9, Jan. 1992; see Abstract.

Chin et al., "Stability of SARS-COV-2 in different environmental conditions", Lancet Microbe 2020; published online April 2, https://doi.org/10.1016/S2666-5247(20)30003-3.

World Health Organization, "Transmission of SARS-COV-2: implications for infection prevention precautions", Jul. 9, 2020.

* cited by examiner

FAST-ACTING ANTIMICROBIAL SURFACES, AND METHODS OF MAKING AND USING THE SAME

PRIORITY DATA

This patent application is a continuation of U.S. patent application Ser. No. 17/090,968, filed on Nov. 6, 2020 (now allowed), which claims priority to U.S. Provisional Patent App. No. 63/037,921, filed on Jun. 11, 2020, each of which is hereby incorporated by reference herein.

FIELD OF THE INVENTION

The present invention generally relates to antimicrobial surfaces and coatings, compositions suitable for antimicrobial surfaces and coatings, and methods of making and using the same.

BACKGROUND OF THE INVENTION

Coronavirus disease 2019 ("COVID-19") is caused by severe acute respiratory syndrome coronavirus 2 ("SARS-CoV-2"). The COVID-19 pandemic has emphasized the importance of environmental cleanliness and hygiene management involving a wide variety of surfaces. Despite the strict hygiene measures which have been enforced, it is has proven to be very difficult to sanitize surfaces all of the time. Even when sanitized, surfaces may get contaminated again.

Respiratory secretions or droplets expelled by infected individuals can contaminate surfaces and objects, creating fomites (contaminated surfaces). Viable SARS-CoV-2 virus can be found on contaminated surfaces for periods ranging from hours to many days, depending on the ambient environment (including temperature and humidity) and the type of surface. See, for example, Van Doremalen et al., "Aerosol and surface stability of SARS-CoV-2 as compared with SARS-CoV-1", *New England Journal of Medicine* 2020; 382: 1564-1567; Pastorino et al., "Prolonged Infectivity of SARS-CoV-2 in Fomites", *Emerging Infectious Diseases* 2020; 26 (9); and Chin et al., "Stability of SARS-CoV-2 in different environmental conditions", *The Lancet Microbe*, e10, Apr. 2, 2020.

There is consistent evidence of SARS-CoV-2 contamination of surfaces and the survival of the virus on certain surfaces. People who come into contact with potentially infectious surfaces often also have close contact with the infectious person, making the distinction between respiratory droplet and fomite transmission difficult to discern. However, fomite transmission is considered a feasible mode of transmission for SARS-CoV-2, given consistent findings about environmental contamination in the vicinity of infected cases and the fact that other coronaviruses and respiratory viruses can transmit this way (World Health Organization, "Transmission of SARS-CoV-2: implications for infection prevention precautions", Jul. 9, 2020 via www.who.int). Virus transmission may also occur indirectly through touching surfaces in the immediate environment or objects contaminated with virus from an infected person, followed by touching the mouth, nose, or eyes. While use of face masks has, generally speaking, become widespread, use of hand gloves has not. Even with gloves, touching of mouth, nose, and eyes still frequently occurs, following the touch of a contaminated surface.

Therefore, there is a desire to prevent the transmission of pathogens (such as, but not limited to, SARS-CoV-2) via surfaces. One method of reducing pathogen transmission is to reduce the period of human vulnerability to infection by reducing the period of viability of SARS-CoV-2 on solids and surfaces.

Surfaces may be treated with chemical biocides, such as bleach and quaternary ammoniums salts, or UV light, to disinfect bacteria and destroy viruses within a matter of minutes. Biocides in liquids are capable of inactivating at least 99.99% of SARS-CoV-2 in as little as 2 minutes, which is attributed to the rapid diffusion of the biocide to microbes and because water aids microbial dismemberment. However, these approaches cannot always occur in real-time after a surface is contaminated.

Alternatively, antimicrobial coatings may be applied to a surface in order to kill bacteria and/or destroy viruses as they deposit. However, to exceed 99.9% reduction of bacteria and/or viruses, conventional antimicrobial coatings typically require at least 1 hour, a time scale which is longer than indirect human-to-human interaction time, such as in an aircraft or shared vehicle, for example. Existing solid coatings are limited by a low concentration of biocides at the surface due to slow biocide transport. The slow diffusion of biocides through the solid coating to the surface, competing with the removal of biocides from the surface by human and environmental contact, results in limited availability and requires up to 2 hours to kill 99.9% of bacteria and/or deactivate 99.9% of viruses.

Water improves transport and aids microbial dismemberment. However, single-material coatings have limited water uptake. Swelling with water is often an unwanted characteristic of single-material coatings, since swelling which can cause coating weakness and degradation if not designed into the coating.

In view of the aforementioned needs in the art, there is a strong desire for an antimicrobial coating that enables fast transport rates of biocides for better effectiveness on deactivating SARS-CoV-2 on surfaces. The coating should be safe, conveniently applied or fabricated, and durable. It is particularly desirable for such a coating to be capable of destroying at least 99%, preferably at least 99.9%, and more preferably at least 99.99% of bacteria and/or viruses in 30 minutes of contact.

SUMMARY OF THE INVENTION

Some variations of the invention provide an antimicrobial structure comprising:
 (a) a solid structural phase comprising a solid structural material;
 (b) a continuous transport phase that is interspersed within the solid structural phase, wherein the continuous transport phase comprises a solid transport material; and
 (c) an antimicrobial agent contained within the continuous transport phase,
 wherein the solid structural phase and the continuous transport phase are separated by an average phase-separation length from about 100 nanometers to about 500 microns.

In some embodiments, the solid structural material is or includes a solid structural polymer selected from the group consisting of a non-fluorinated carbon-based polymer, a silicone, a fluorinated polymer, and combinations thereof.

A non-fluorinated carbon-based polymer may be selected from the group consisting of polyalkanes, polyurethanes, polyethers, polyureas, polyesters, and combinations thereof.

A silicone may be selected from the group consisting of polydimethyl siloxane, polytrifluoropropylmethyl siloxane, polyaminopropylmethyl siloxane, polyaminoethylaminopropylmethyl siloxane, polyaminoethylaminoisobutylmethyl siloxane, and combinations thereof.

A fluorinated polymer may be selected from the group consisting of fluorinated polyols, perfluorocarbons, perfluoropolyethers, polyfluoroacrylates, polyfluorosiloxanes, polyvinylidene fluoride, polytrifluoroethylene, and combinations thereof.

In some embodiments, the solid transport material is or includes a solid transport polymer selected from a hygroscopic polymer, a hydrophobic and non-lipophobic polymer, a hydrophilic polymer, an electrolyte polymer, and combinations thereof.

A hygroscopic solid transport polymer may be selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), modified cellulosic polymers, carboxymethyl cellulose, hydroxyethyl cellulose, hydroxypropyl cellulose, methyl cellulose, and combinations thereof.

A hydrophobic, non-lipophobic solid transport polymer may be selected from the group consisting of poly(propylene glycol), poly(tetramethylene glycol), polybutadiene, polycarbonate, polycaprolactone, acrylic polyols, and combinations thereof.

A hydrophilic solid transport polymer may be a polymer with ionic charge that may be present within the hydrophilic solid transport polymer as carboxylate groups, amine groups, sulfate groups, or phosphate groups, for example.

An electrolyte solid transport polymer may be selected from the group consisting of polyethylene oxide, polypropylene oxide, polycarbonates, polysiloxanes, polyvinylidene difluoride, and combinations thereof.

In preferred embodiments, the solid structural material is a solid structural polymer, the solid transport material is a solid transport polymer, and the solid structural polymer is crosslinked, via a crosslinking molecule, with the solid transport polymer. The crosslinking molecule may include at least one moiety selected from the group consisting of an amine moiety, a hydroxyl moiety, an isocyanate moiety, and a combination thereof, for example. In certain embodiments, at least one moiety is an isocyanate moiety, which may be a blocked isocyanate.

In some embodiments, the continuous transport phase is a solid solution or solid suspension of the solid transport material and the antimicrobial agent.

In other embodiments, the continuous transport phase contains a transport-phase liquid that at least partially dissolves the antimicrobial agent. The transport-phase liquid may be selected from the group consisting of water, dialkyl carbonate, propylene carbonate, γ-butyrolactone, 2-phenoxyethanol, and combinations thereof.

Alternatively, or additionally, the transport-phase liquid is selected from polar solvents.

Alternatively, or additionally, the transport-phase liquid is selected from ionic liquids.

In certain embodiments, the transport-phase liquid contains one or more water-soluble salts, one or more of which may function as an antimicrobial agent. Exemplary water-soluble salts include, but are not limited to, copper chloride, copper nitrate, zinc chloride, zinc nitrate, silver chloride, silver nitrate, or combinations thereof. In some embodiments, water-soluble salts are selected from quaternary ammonium salts, such as benzalkonium chloride, benzethonium chloride, methylbenzethonium chloride, cetalkonium chloride, cetylpyridinium chloride, cetrimonium, cetrimide, tetraethylammonium bromide, didecyldimethylammonium chloride, dioctyldimethylammonium chloride, domiphen bromide, or combinations thereof.

In certain embodiments, the transport-phase liquid is a eutectic liquid salt, which is optionally derived from ammonium salts. The eutectic liquid salt may contain an antimicrobial agent or be otherwise antimicrobially active.

In some embodiments, the continuous transport phase contains a liquid electrolyte, a solid electrolyte, or both a liquid electrolyte and a solid electrolyte.

In some embodiments, the antimicrobial agent is selected from quaternary ammonium molecules. Exemplary quaternary ammonium molecules include, but are not limited to, benzalkonium chloride, benzethonium chloride, methylbenzethonium chloride, cetalkonium chloride, cetylpyridinium chloride, cetrimonium, cetrimide, tetraethylammonium bromide, didecyldimethylammonium chloride, dioctyldimethylammonium chloride, and domiphen bromide.

In some embodiments, the antimicrobial agent is selected from N-halamines. Exemplary N-halamines include, but are not limited to, hydantoin (imidazolidine-2,4-dione); 1,3-dichloro-5,5-dimethylhydantoin; 3-bromo-1-chloro-5,5-dimethylhydantoin; 5,5-dimethylhydantoin; 4,4-dimethyl-2-oxazalidinone; tetramethyl-2-imidazolidinone; and 2,2,5,5-tetramethylimidazo-lidin-4-one.

In some embodiments, the antimicrobial agent is selected from oxidizing molecules, such as (but not limited to) those selected from the group consisting of sodium hypochlorite, hypochlorous acid, hydrogen peroxide, and combinations thereof.

In some embodiments, the antimicrobial agent is selected from metal ions, such as (but not limited to) metal ions selected from the group consisting of silver, copper, zinc, and combinations thereof.

The antimicrobial structure may be characterized in that the antimicrobial agent has a diffusion coefficient between $10^{-16}$ m$^2$/s and $10^{-9}$ m$^2$/s, measured at 25° C. and 1 bar, within the continuous transport phase.

The antimicrobial structure may be characterized in that the antimicrobial agent is replenished on an outer surface of the antimicrobial structure to at least 25% of the original concentration of antimicrobial agent, in 100 minutes or less.

In some embodiments, the antimicrobial structure contains embedded electrodes in a configuration such that the antimicrobial agent is electrically or electrochemically rechargeable.

The antimicrobial structure may further contain one or more additives, such as (but not limited to) salts, buffers, UV stabilizers, fillers, or combinations thereof.

The antimicrobial structure may further contain one or more protective layers, such as environmentally protective layer(s).

In some antimicrobial structures, the average phase-separation length is from about 0.5 microns to about 100 microns. In certain embodiments, the average phase-separation length is from about 1 micron to about 50 microns.

The antimicrobial structure may be a coating or may be present in a coating. Alternatively, or additionally, the antimicrobial structure may be present at a surface of a bulk object. The antimicrobial structure may be the entirety of a bulk object.

DETAILED DESCRIPTION OF EMBODIMENTS OF THE INVENTION

Figure 1:
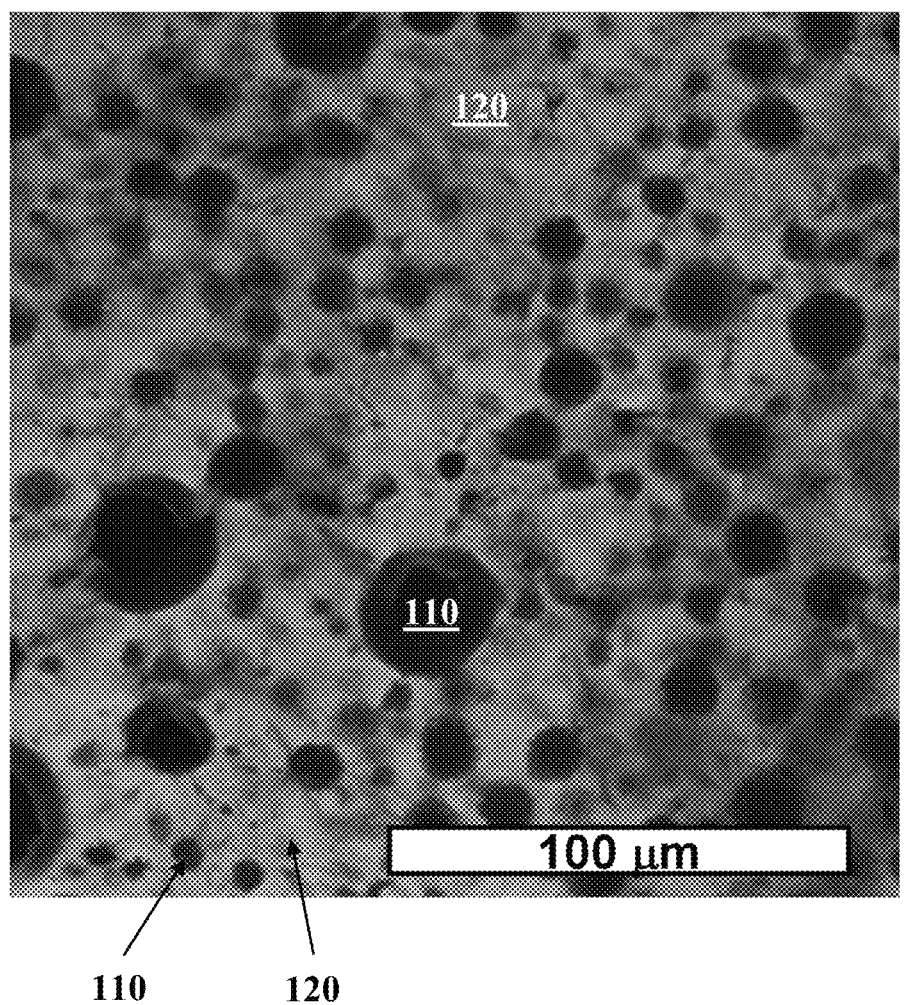
FIG. 1 is a top view of an antimicrobial structure that contains a discrete solid phase that provides abrasion resistance, and a continuous transport phase that transports antimicrobial agents to the outer surface to inactivate or kill microbes, in some embodiments of the invention.

The structures, systems, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in a Markush group. Thus in some embodiments not otherwise explicitly recited, any instance of "comprising" may be replaced by "consisting of" or, alternatively, by "consisting essentially of."

Some variations of the invention are predicated on polymeric coatings that are solid but have fast transport rates of antimicrobial agents, enabled by a two-phase architecture with a solid structural phase combined with an antimicrobial-containing continuous transport phase that is phase-separated with the solid structural phase. As defined in this patent application, "antimicrobial agents" or synonymously "antimicrobial actives" include germicides, bactericides, virucides (antivirals), antifungals, antiprotozoals, antiparasites, and biocides. In some embodiments, antimicrobial agents are specifically bactericides, such as disinfectants, antiseptics, and/or antibiotics. In some embodiments, antimicrobial agents are specifically virucides, or include virucides.

This invention resolves the technical tradeoffs between antimicrobial solutions and solid surfaces. Conventional liquid solutions are fast but not persistent. Liquid solutions can reduce the population of bacteria and viruses on a timescale of minutes, but the liquid solutions do not stay on surfaces and have a one-time effect. Conventional solid antimicrobial surfaces reduce bacteria and virus populations quite slowly, causing bacteria and virus to remain on surfaces for extended times. See Behzadinasab et al., "A Surface Coating that Rapidly Inactivates SARS-CoV-2", *ACS Appl. Mater. Interfaces* 2020, 12, 31, as an example of an antimicrobial coating that requires at least 1 hour for effectiveness. The slow activity of conventional solid antimicrobial materials is due to the time needed for antimicrobial agents to diffuse to the surface. These surfaces also fail to work if they are dirty, because soil blocks the transport of antimicrobial agents to the surface.

By contrast, the material disclosed herein breaks the trade between activity and persistence. The solid structural phase provides persistence on a surface while the continuous transport phase allows antimicrobial agents to move to microbes (e.g., viruses or bacteria) on the surface at order-of-magnitude faster rates than is possible with diffusion through a single solid material. A biphasic structure simultaneously provides durability and fast transport to the surface where antimicrobial agents can kill or deactivate microbes at the surface. The continuous transport phase may contain an aqueous or non-aqueous solvent or electrolyte to further enhance transport rates of antimicrobial agents. In some embodiments, the continuous transport phase passively absorbs water from the environment, which water may enhance transport rates of antimicrobial agents and/or improve the effectiveness of the antimicrobial agents.

There are many commercial applications of antimicrobial surfaces in homes (e.g., kitchens and bathrooms), in restaurants, on clothing and personal protective equipment, in cars (especially shared-ride vehicles to inhibit the transfer of microbes from one person to another), in airplanes (e.g., for contaminated surfaces that UV light cannot reach), and inside and outside vehicles used to rescue or move people who have been exposed to diseases and pandemics.

Some variations of the invention provide an antimicrobial structure comprising:
(a) a solid structural phase comprising a solid structural material;
(b) a continuous transport phase that is interspersed within the solid structural phase, wherein the continuous transport phase comprises a solid transport material; and
(c) an antimicrobial agent contained within the continuous transport phase,
wherein the solid structural phase and the continuous transport phase are separated by an average phase-separation length from about 100 nanometers to about 500 microns.

Certain variations provide an antimicrobial structure intended to contain antimicrobial agent, the antimicrobial structure comprising:
(a) a solid structural phase comprising a solid structural material;
(b) a continuous transport phase that is interspersed within the solid structural phase, wherein the continuous transport phase comprises a solid transport material, and wherein the continuous transport phase is capable of containing an antimicrobial agent (such as at a time of intended use or regeneration),
wherein the solid structural phase and the continuous transport phase are separated by an average phase-separation length from about 100 nanometers to about 500 microns.

In some embodiments, the solid structural material is or includes a solid structural polymer selected from the group consisting of a non-fluorinated carbon-based polymer, a silicone, a fluorinated polymer, and combinations thereof. These types of polymers are preferred when anti-wetting properties (from water or other hydrophilic liquids) are desired for the solid structural material, providing a dry-feel surface. A hydrophobic and/or lyophobic solid structural material prevents or minimizes soil adhesion and penetration of debris into the overall structure.

A non-fluorinated carbon-based polymer may be selected from the group consisting of polyalkanes, polyurethanes, polyethers, polyureas, polyesters, and combinations thereof.

A silicone may be selected from the group consisting of polydimethyl siloxane, polytrifluoropropylmethyl siloxane, polyaminopropylmethyl siloxane, polyaminoethylaminopropylmethyl siloxane, polyaminoethylaminoisobutylmethyl siloxane, and combinations thereof.

A fluorinated polymer may be selected from the group consisting of fluorinated polyols, perfluorocarbons, perfluoropolyethers, polyfluoroacrylates, polyfluorosiloxanes, polyvinylidene fluoride, polytrifluoroethylene, and combinations thereof.

In some embodiments, the solid transport material is or includes a solid transport polymer selected from a hygroscopic polymer, a hydrophobic and non-lipophobic polymer, a hydrophilic polymer, an electrolyte polymer, and combinations thereof. As described below, the continuous transport phase may further include a transport-phase liquid, which may be organic or inorganic.

In some embodiments, the solid transport material is or includes a hygroscopic solid transport polymer. The hygroscopic solid transport polymer may be selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), modified cellulosic polymers, carboxymethyl cellulose, hydroxyethyl cellulose, hydroxypropyl cellulose, methyl cellulose, and combinations thereof, for example. For instance, a hygroscopic solid transport polymer may be a crosslinked poly(acrylic acid) emulsion polymer (e.g., Carbopol® polymers) that can bind with antimicrobial agents.

In some embodiments, the solid transport material is or includes a hydrophobic, non-lipophobic solid transport polymer. The hydrophobic, non-lipophobic solid transport polymer may be selected from the group consisting of poly (propylene glycol) (PPG), poly(tetramethylene glycol) (PTMEG, also known as polytetrahydrofuran or polyTHF), polybutadiene, polycarbonate, polycaprolactone, acrylic polyols, and combinations thereof, for example.

In some embodiments, the solid transport material is or includes a hydrophilic solid transport polymer. The hydrophilic solid transport polymer may be a polymer created with ionic charge that may be present within the hydrophilic solid transport polymer as pendant or main-chain carboxylate groups, amine groups, sulfate groups, or phosphate groups, for example. In certain embodiments, monomers containing ionic charge are inserted along the polymer backbone. The hydrophilic solid transport polymer may bind with antimicrobial agents.

In some embodiments, the solid transport material is or includes an electrolyte solid transport polymer. The electrolyte solid transport polymer may be selected from the group consisting of polyethylene oxide, polypropylene oxide, polycarbonates, polysiloxanes, polyvinylidene difluoride, and combinations thereof, for example.

In preferred embodiments, a solid structural polymer is crosslinked, via a crosslinking molecule, with a solid transport polymer. The crosslinking is preferably covalent crosslinking, but can also be ionic crosslinking. When the discrete and continuous phases are covalently crosslinked, an abrasion-resistant structure is established within the continuous transport phase. Additionally, when the structural polymer and the transport polymer are crosslinked, the length scales of the different phases can be controlled, such as to enhance transport rates of the antimicrobial agent.

A crosslinking molecule (when present) may include at least one moiety selected from the group consisting of an amine moiety, a hydroxyl moiety, an isocyanate moiety, and a combination thereof, for example. Other crosslinking molecules may be employed. In certain embodiments, at least one moiety is an isocyanate moiety, which may be a blocked isocyanate.

In some embodiments, the continuous transport phase is a solid solution or solid suspension of the solid transport material and the antimicrobial agent. For example, when the antimicrobial agent is a liquid, the continuous transport phase may be a solution of the solid transport material and the antimicrobial agent. When the antimicrobial agent is a solid, the continuous transport phase may be a suspension of the solid transport material and the antimicrobial agent.

In other embodiments, the continuous transport phase contains a transport-phase liquid that at least partially dissolves the antimicrobial agent. The transport-phase liquid may be selected from the group consisting of water, dialkyl carbonate, propylene carbonate, γ-butyrolactone, 2-phenoxyethanol, and combinations thereof.

Alternatively, or additionally, the transport-phase liquid is selected from polar solvents. Polar solvents may be protic polar solvents or aprotic polar solvents. Exemplary polar solvents include, but are not limited to, water, alcohols, ethers, esters, ketones, aldehydes, carbonates, and combinations thereof. In some embodiments, the transport-phase liquid is water that is passively incorporated from atmospheric humidity.

Alternatively, or additionally, the transport-phase liquid is selected from ionic liquids. Exemplary ionic liquids include, but are not limited to, ammonium-based ionic liquids synthesized from substituted quaternary ammonium salts.

The transport-phase liquid may include a high ion concentration to aid transport of antimicrobial agent and/or to enhance the uptake of fluids that, in turn, aid transport of antimicrobial agent.

In some embodiments, the antimicrobial agent is selected from quaternary ammonium molecules (whether or not classified as an ionic liquid). Exemplary quaternary ammonium molecules include, but are not limited to, benzalkonium chloride, benzethonium chloride, methylbenzethonium chloride, cetalkonium chloride, cetylpyridinium chloride, cetrimonium, cetrimide, tetraethylammonium bromide, didecyldimethylammonium chloride, dioctyldimethylammonium chloride, and domiphen bromide. Quaternary ammonium molecules or eutectic mixtures of quaternary ammonium molecules that are liquids at room temperature—ionic liquids or ionic liquid eutectics, respectively—enable liquid-state rates of transport with negligible vapor pressure. A specific example is tetrabutylammonium heptadecafluorooctanesulfonate ($C_{24}H_{36}F_{17}NO_3S$), which has a melting point <5° C. Another specific example is tetraoctylammonium chloride ($C_{32}H_{68}ClN$) with a melting point of 50-54° C. mixed with tetraheptylammonium chloride ($C_{28}H_{60}ClN$) with a melting point of 38-41° C. in a eutectic composition ratio that forms a liquid at room temperature (25° C.). Quaternary ammonium molecules may be mixed with imidazolium-based ionic liquids, pyridinium-based ionic liquids, pyrrolidinium-based ionic liquids, and/or phosphonium-based ionic liquids.

In certain embodiments, the transport-phase liquid contains one or more water-soluble salts, one or more of which may function as an antimicrobial agent. Exemplary water-soluble salts include, but are not limited to, copper chloride, copper nitrate, zinc chloride, zinc nitrate, silver chloride, silver nitrate, or combinations thereof. Other exemplary water-soluble salts include quaternary ammonium salts, such as (but not limited to) the quaternary ammonium molecules recited above.

In certain embodiments, the transport-phase liquid is a eutectic liquid salt, which is optionally derived from ammonium salts. The eutectic liquid salt may contain an antimicrobial agent or be otherwise antimicrobially active.

In some embodiments, the antimicrobial agent is selected from N-halamines. N-halamines are compounds that stabilize an oxidizing agent (such as chlorine contained within the N-halamine molecule) and may be used to kill or deactivate microbes. N-halamines remain stable, unlike sodium hypochlorite (bleach), over long time periods and may be recharged by exposure to an oxidizer such as dilute bleach or ozone. Exemplary N-halamines include, but are not limited to, hydantoin (imidazolidine-2,4-dione); 1,3-dichloro-5,5-dimethylhydantoin; 3-bromo-1-chloro-5,5-dimethylhydantoin; 5,5-dimethylhydantoin; 4,4-dimethyl-2-oxazalidinone; tetramethyl-2-imidazolidinone; and 2,2,5,5-tetramethylimidazo-lidin-4-one. Examples of antimicrobial N-halamines are also disclosed in Lauten et al., *Applied and Environmental Microbiology* Vol. 58, No. 4, Pages 1240-1243 (1992), which is incorporated by reference.

In some embodiments, the antimicrobial agent is selected from oxidizing molecules, such as (but not limited to) those selected from the group consisting of sodium hypochlorite, hypochlorous acid, hydrogen peroxide, and combinations thereof.

In some embodiments, the antimicrobial agent is selected from metal ions, such as (but not limited to) silver, copper, zinc, cobalt, nickel, or combinations thereof. Any metal ion with at least some antimicrobial activity itself, or which confers antimicrobial activity to a compound which the metal ion binds to, may be employed. The metal ion may be present in a metal complex or a metal salt, for example. In certain embodiments, the antimicrobial agent contains a neutral metal (e.g., zero-valent silver, copper, or zinc) which may be dissolved in a liquid and/or may be present as nanoparticles, for example.

A liquid electrolyte or solid electrolyte (or both) may be included in the continuous transport phase, to increase transport rates of the antimicrobial agent.

An exemplary electrolyte is a complex formed between poly(ethylene oxide) and metal salts, such as poly(ethylene oxide)—$Cu(CF_3SO_3)_2$ which is a known copper conductor. $Cu(CF_3SO_3)_2$ is the copper(II) salt of trifluoromethanesulfonic acid. See Bonino et al., "Electrochemical properties of copper-based polymer electrolytes", *Electrochimica Acta*, Vol. 37, No. 9, Pages 1711-1713 (1992), which is incorporated by reference.

When a liquid electrolyte is included in the continuous transport phase, one or more solvents for the liquid electrolyte may be present. Solvents for the liquid electrolyte may be selected from the group consisting of sulfoxide, sulfolane, ethylene carbonate, propylene carbonate, dimethyl carbonate, diethyl carbonate, methyl ethyl carbonate, 1,2-dimethoxyethane, 1,2-diethoxyethane, γ-buterolactone, γ-valerolactone, 1,3-dioxolane, tetrahydrofuran, 2-methyltetrahydrofuran, acetonitrile, proprionitrile, diglyme, triglyme, methyl formate, trimethyl phosphate, triethyl phosphate, and mixtures thereof, for example.

When a liquid electrolyte is included in the continuous transport phase, there may be a salt within an aqueous or non-aqueous solvent. Exemplary salts are salts of transition metals (e.g., V, Ti, Cr, Co, Ni, Cu, Zn, Tb, W, Ag, Cd, or Au), salts of metalloids (e.g., Al, Ga, Ge, As, Se, Sn, Sb, Te, or Bi), salts of alkali metals (e.g., Li, Na, or K), salts of alkaline earth metals (e.g., Mg or Ca), or a combination thereof.

In some embodiments, a gel electrolyte is included in the continuous transport phase. A gel electrolyte contains a liquid electrolyte including an aqueous or non-aqueous solvent as well as a salt, in a polymer host. The solvent and salt may be selected from the lists above. The polymer host may be selected from the group consisting of poly(ethylene oxide), poly(vinylidene fluoride), poly(acrylonitrile), poly (methyl methacrylate), poly(vinylidene fluoride-hexafluoropropylene) (PVdF-co-HFP, polycarbonate, polysiloxane, and combinations thereof.

When a solid electrolyte is included in the continuous transport phase, the solid electrolyte is preferably concentrated enough to enable sufficient ionic percolation. Solid electrolytes may be oxides, sulfides, halides, or a combination thereof. Exemplary solid electrolytes include, but are not limited to, β-alumina, β"-alumina, Cu-β-alumina, Cu-β"-alumina, Ag-β-alumina, and Ag-β"-alumina. β-alumina and β"-alumina are good conductors of mobile ions. β"-alumina is a hard polycrystalline or monocrystalline ceramic which, when prepared as an electrolyte, is complexed with a mobile ion, such as (but not limited to) $Cu^{2+}$ or $Ag^+$ β-alumina and/or β"-alumina are also referred to herein as "beta-alumina."

Other solid electrolytes include yttria-stabilized zirconia, sodium superionic conductor (NASICON), lithium superionic conductor (LISICON), potassium superionic conductor (KSICON), lithium thiogermanate thiophosphate (LGPS), or combinations of any of the foregoing. Chalcogenide glasses may be used as solid electrolytes. Exemplary chalcogenide glasses include RbI—GeSe$_2$—Ga$_2$Ge$_3$ and CsI—GeSe$_2$—Ga$_2$Ge$_3$.

Solid electrolytes for conducting copper ions may include cuprous halides, such as (but not limited to) CuCl, CuBr, CuI, or a combination thereof. Conductivities on the order of 0.1 S/cm are possible at room temperature with some mixed phases, such as RbCuCl I. Solid electrolytes for conducting copper ions may include copper sulfides, Cu$_x$S$_y$, wherein x and y may vary. For example, when y=1, x may be selected from about 1 to less than 2, such as 1.0, 1.1, 1.2, 1.3, 1.4, 1.5, 1.6, 1.7, 1.8, or 1.9.

Solid electrolytes for conducting silver ions may include silver-ion conductors, such as (but not limited to) AgI, Ag$_2$SeO$_4$, RbAg$_4$I$_5$, or a combination thereof. AgI has an ionic conductivity of about 0.1 S/cm at 150° C. RbAg$_4$I$_5$ has an ionic conductivity of about 0.1 S/cm at 25° C.

When a solid electrolyte is present, it may be incorporated into the continuous transport phase as its own continuous or semi-continuous phase, meaning that there is physical connectivity of regions of solid electrolyte. However, the solid electrolyte need not be continuous throughout the entire material. In certain embodiments, the solid electrolyte is incorporated into a solid matrix phase that is distinct from the continuous transport phase. In these embodiments, the separate solid electrolyte matrix phase may be polymeric, ceramic, metallic, or a combination thereof.

In certain embodiments, the antimicrobial structure further contains one or more layers of an antimicrobial-agent storage phase that is distinct from the continuous transport phase and the solid structural phase. In these or other certain embodiments, the antimicrobial structure further contains inclusions of an antimicrobial-agent storage phase that is distinct from the continuous transport phase and the solid structural phase. An antimicrobial-agent storage phase may be fabricated from the same material as the solid transport material, or from a different material. For example, both the solid transport material and the antimicrobial-agent storage phase (when present) may be made from a hydrophobic, non-lipophobic polymer. The antimicrobial-agent storage phase may contain an antimicrobial agent that is released initially, continuously, or periodically into the continuous transport phase.

The antimicrobial structure may further contain one or more additives, such as (but not limited to) salts, buffers, UV stabilizers, fillers, or combinations thereof. Additives, when present, may be incorporated into the solid structural phase, the continuous transport phase, both of these phases, or neither of these phases but within a separate phase.

When an additive is a salt, there will be a cation and anion forming the salt. The cation element may be Li, Na, K, Mg, and/or Ca, for example. The anion element or group may be F, Cl, Br, I, SO$_3$, SO$_4$, NO$_2$, NO$_3$, CH$_3$COO, and/or CO$_3$, for example.

When an additive is a buffer, it may be an inorganic or organic molecule that maintains a pH value or pH range via acid-base reactions. A buffer may be discrete or may be bonded to the solid transport material, for example.

When an additive is a UV stabilizer, it may be an antioxidant (e.g., a thiol), a hindered amine (e.g., a derivative of tetramethylpiperidine), UV-absorbing nanoparticles (e.g., CdS, CdTe, or ZnS—Ag nanoparticles), or a combination thereof, for example.

When an additive is a particulate filler, it may be selected from the group consisting of silica, alumina, silicates, talc, aluminosilicates, barium sulfate, mica, diatomite, calcium carbonate, calcium sulfate, carbon, wollastonite, and a combination thereof, for example. A particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof, for example.

An exemplary antimicrobial structure 100 is depicted in FIG. 1, which is a top view of the outer surface of the antimicrobial structure 100. In FIG. 1, the antimicrobial structure 100 is biphasic, containing a discrete solid phase 110 that provides abrasion resistance, and a continuous transport phase 120 that stores antimicrobial agents and transports the antimicrobial agents to the outer surface in order to inactivate or kill microbes. An antimicrobial agent (not shown) is preferably contained selectively within the continuous transport phase 120, such that the antimicrobial structure 100 is capable of destroying microbes (e.g., viruses and/or bacteria). The 100-micron scale bar in FIG. 1 is exemplary and indicative of the length scales of the discrete solid phase 110, the continuous transport phase 120, and the distance between the phases. The structure 100 may be a coating on a substrate (not shown) or may be a bulk material or object, for example.

Figure 2:
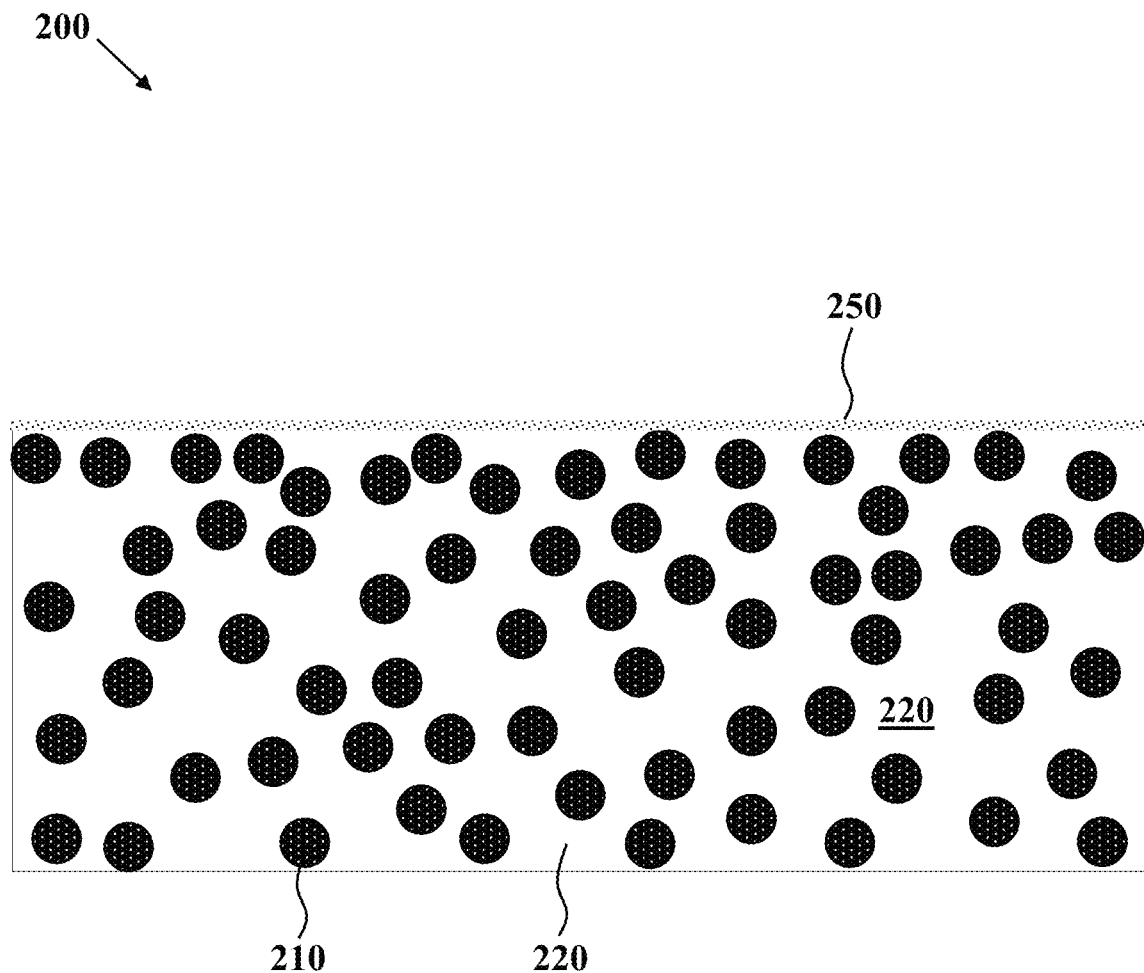
FIG. 2 is a through-thickness side view of a coating or bulk material that contains a discrete solid phase and a continuous transport phase that stores antimicrobial agents and transports the antimicrobial agents to the outer layer in order to inactivate or kill microbes, in some embodiments.

An exemplary antimicrobial structure 200 is depicted in FIG. 2, which is a through-thickness side view of a coating or bulk material. There is an outer layer 250 that may contain microbes from environmental sources (microbes not depicted) and is generally exposed to the environment. In FIG. 2, the antimicrobial structure 200 is biphasic, containing a discrete solid phase 210 and a continuous transport phase 220 that stores antimicrobial agents and transports the antimicrobial agents to the outer layer 250 in order to inactivate or kill microbes that may be present there. An antimicrobial agent (not shown) is preferably contained selectively within the continuous transport phase 220, such that the antimicrobial structure 200 is capable of destroying microbes (e.g., viruses and/or bacteria) after transport of the antimicrobial agent to the outer layer 250 and/or potentially after diffusion of microbes from the outer layer 250 into the continuous transport phase 220 which exposes the microbes to the antimicrobial agent. The structure 200 may be a coating on a substrate (not shown) or may be a bulk material or object, for example. A substrate, if present, would typically be distally opposite the outer layer 250.

In some embodiments, the antimicrobial structure contains embedded electrodes in a configuration such that the antimicrobial agent is electrically or electrochemically rechargeable. As intended herein, "rechargeable" refers to being chargeable during use as well as being initially chargeable when first deployed.

Figure 3:
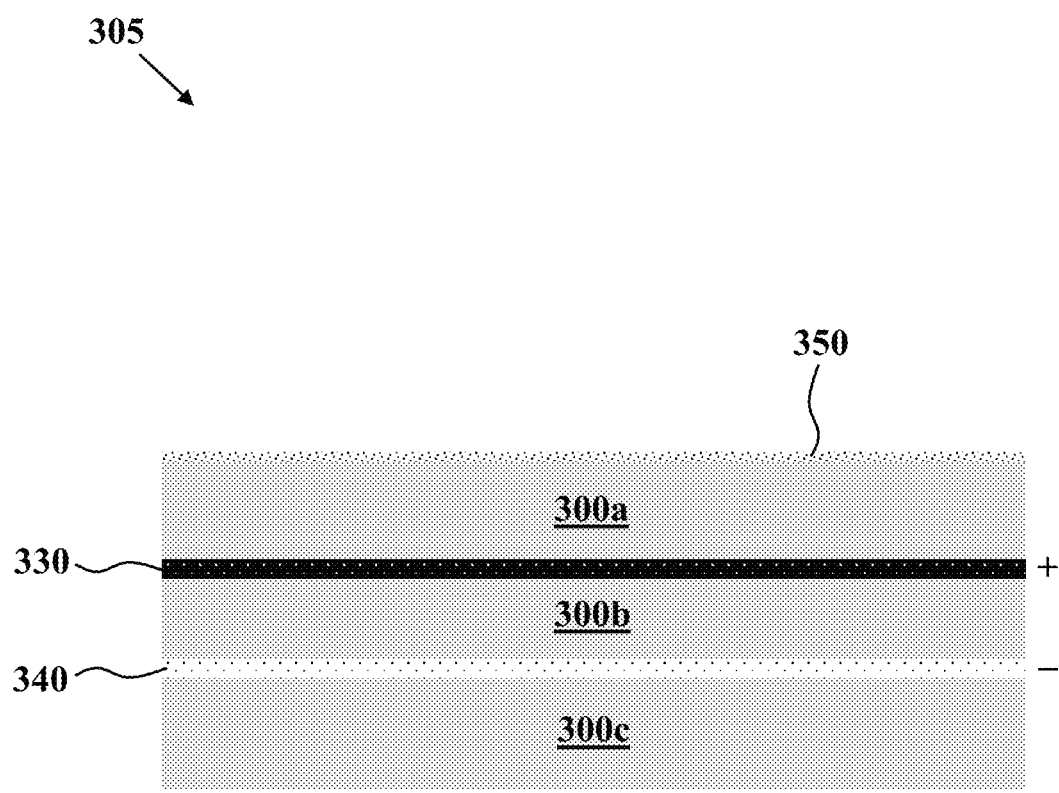
FIG. 3 is a sketch of an antimicrobial structure (through-thickness side view) with an antimicrobial agent that is rechargeable by applying a voltage between two embedded electrodes of opposite polarity, in some embodiments of the invention.

FIG. 3 is a sketch of an antimicrobial structure 305 (through-thickness side view of coating or material) with a rechargeable antimicrobial agent. In FIG. 3, the antimicrobial structure 305 includes antimicrobial material 300*a*/300*b*/300*c* which is fabricated from the same components as the structure in FIG. 2. In particular, material 300*a*/300*b*/300*c* includes a solid structural phase (210 in FIG. 2) and a continuous transport phase (220 in FIG. 2), which for purposes of clear illustration are shown in uniform grayscale in FIG. 3 as material 300*a*/300*b*/300*c*.

In FIG. 3, there are two embedded electrodes 330 and 340 within the antimicrobial structure 305, wherein electrode 330 is depicted as a positive electrode layer and electrode 340 is depicted as a negative electrode layer. The electrode polarities may be switched. The electrodes may be fabricated from metal grids, meshes, or perforated plates, for example, and may contain metals and catalysts such as Ti, Pt, Ru, Ir, or a combination thereof, for example. Electrode leads (not shown) will carry electrical current to or from the electrodes. While the electrodes 330, 340 are depicted as embedded layers, other electrode configurations are possible, including one or both electrodes being outer layers, one of the electrodes being integrated with a base substrate or a wall of an object, or non-planar electrode architectures, for example.

In FIG. 3, there is an outer layer 350 that may contain microbes from environmental sources (microbes not depicted) and is generally exposed to the environment. The structure 305 may be a coating on a substrate (not shown) or may be a bulk material or object, for example. A substrate, if present, would typically be distally opposite the outer layer 350.

A suitable antimicrobial agent may be electrochemically charged or recharged (e.g. after a period of use). In rechargeable configurations, the continuous transport phase will typically be wet with a liquid solution containing water or another solvent, and/or a liquid electrolyte (optionally, a gel electrolyte). The liquid solution contains an antimicrobial agent or a precursor to an antimicrobial agent. The liquid solution may contain a salt and/or a pH buffer as well.

For example, when the selected antimicrobial agent is sodium hypochlorite (NaOCl) and/or hypochlorous acid (HOCl), sodium chloride (NaCl) may be used as an antimicrobial agent precursor. In particular, for example, a voltage may be applied such that NaCl dissolved in the transport phase within material 300b (between electrodes 330, 340) is electrochemically transformed into sodium hypochlorite and/or hypochlorous acid, depending on the pH. NaOCl and/or HOCl are antimicrobially active. After NaOCl and/or HOCl are produced electrochemically, the NaOCl and/or HOCl permeates (via the continuous transport phase) throughout the structure 305, i.e., from material 300b into materials 300a and 300c. The desired location is material 300a, especially near or at the outer layer 350, where microbes may be concentrated. Since NaOCl and/or HOCl present in material 300c will typically not be removed by environmental forces during use, there will normally be a concentration gradient in the direction toward the outer layer 350, which is desired for effective replenishment and thus recharging. A periodic wash or soak with a salt solution (e.g., 2500-6000 ppm NaCl) and buffer may be used to maintain pH. A period soak with a liquid electrolyte may be used to enhance transport rates of the antimicrobial agent or precursor thereof.

As another example, sodium hypochlorite and/or hypochlorous acid may be generated by applying a voltage between electrodes 330, 340 as noted above, wherein the NaOCl and/or HOCl are antimicrobial agent precursor(s) for recharging N-halamines that form the selected antimicrobial agent.

The antimicrobial structure may further contain one or more protective layers, such as environmentally protective layer(s). Thus the antimicrobial structure may be a multi-layer structure, which may contain two layers, three layers, four layers, or more. In some embodiments, there is an outer layer to seal the active components from the environment while retaining and diffusing antimicrobial agents over time.

There may be one or more capping layers that protect a liquid-like layer underneath a capping layer, reducing evaporation of liquids. In these embodiments, microbes (e.g., bacteria or viruses) may enter through a capping layer to reach the antimicrobial agent under the capping layer. Alternatively, or additionally, microbes may remain on the capping layer and antimicrobial agent diffuses through the capping layer to reach the microbes.

In certain embodiments, the antimicrobial structure contains a porous top layer and an absorbing inner layer that contains antimicrobial agents. In these embodiments, the porous top layer may include a material such as expanded polytetrafluoroethylene (e.g., Gore-Tex®), which allows vapor but not liquid to be exchanged. A bottom sealing layer may be incorporated to prevent the loss of the antimicrobial agents.

In certain embodiments, the antimicrobial structure includes a multi-layer sub-structure wherein at least one layer contains the biphasic architecture as disclosed herein, and wherein an internal or encapsulated layer contains antimicrobial agents and/or preferentially traps microbes to enhance antimicrobial effectiveness.

The antimicrobial structure may be characterized in that the antimicrobial agent has a diffusion coefficient (diffusivity) between $10^{-16}$ m$^2$/s and $10^{-9}$ m$^2$/s, measured at a temperature of 25° C. and a pressure of 1 bar, within the continuous transport phase. In various embodiments, the antimicrobial agent diffusion coefficient is about, or at least about, $10^{-16}$ m$^2$/s, preferably $10^{-14}$ m$^2$/s, more preferably $10^{-12}$ m$^2$/s, even more preferably $10^{-10}$ m$^2$/s, or most preferably $10^{-14}$ m$^2$/s, measured at 25° C. and 1 bar. A diffusion coefficient on the order of $10^{-9}$ m$^2$/s is a liquid-like diffusion coefficient and is much higher, generally, than a purely solid-state diffusion coefficient.

The antimicrobial structure disclosed herein is not limited to transport of antimicrobial agent exclusively by pure diffusion. Depending on the specific choice of materials, antimicrobial agent, and method of using the structure, the actual transport may occur by various mass-transfer mechanisms including, but not limited to, Fickian diffusion, non-Fickian diffusion permeation, sorption transport, solubility-diffusion, charge-driven flow, convection, capillary-driven flow, and so on. As just one example, when the antimicrobial structure is employed in an automobile, the structure can move around quickly in space such that the antimicrobial agent undergoes some amount of centrifugal convection.

Even when the mass transport is dominated by diffusion, the actual transport rate (flux) of antimicrobial agent through the structure depends not only on the diffusion coefficient, but also on the three-dimensional concentration gradient, temperature, and possibly other factors such as pH. In various embodiments, the actual flux of antimicrobial agent through the structure is about, or at least about, 2×, 3×, 4×, 5×, 10×, 20×, 30×, 40×, 50×, 100×, 200×, 300×, 400×, 500×, or 1000× higher than the flux through a solid-state material. A person of ordinary skill in the art can calculate or estimate transport fluxes for a given structure geometry and materials, or carry out experiments to determine such fluxes.

The antimicrobial structure will be characterized by an original concentration of antimicrobial agent (prior to exposure to microbes). The original concentration of antimicrobial agent may be selected based on the type of antimicrobial agent, and intended use of the antimicrobial structure, and/or other factors. In various embodiments, the original concentration of antimicrobial agent is about, at least about, or at most about 0.00001 wt %, 0.0001 wt %, 0.001 wt %, 0.01 wt %, 0.1 wt %, 1 wt %, 5 wt %, 10 wt %, 20 wt %, 30 wt %, 40 wt %, or 50 wt %, on the basis of mass of antimicrobial agent divided by total mass of all components within 0.1%, 1%, 5%, or 10% depth from the surface into the bulk structure.

The antimicrobial structure may be characterized in that the antimicrobial agent is replenished on an outer surface of the antimicrobial structure to at least 25% of the original concentration of antimicrobial agent, in 100 minutes or less. In various embodiments, the antimicrobial agent is replenished on an outer surface of the antimicrobial structure to at least 30%, 40%, 50%, 60%, 70%, 75%, 80%, 85%, 90%, 95%, 99%, 99.9%, or 100% of the original concentration of antimicrobial agent, in 100 minutes or less. In these or other embodiments, the antimicrobial agent is replenished on an outer surface of the antimicrobial structure to at least 25% of the original concentration of antimicrobial agent, in 90, 80, 70, 60, 50, 40, 30, 20, 15, 10, 5, 4, 3, 2, or 1 minutes or less. Preferably, the antimicrobial agent is replenished on an outer surface of the antimicrobial structure to at least 50% of the original concentration of antimicrobial agent, in 60, 30, 20, 15, 10, 5, 4, 3, 2, or 1 minutes or less. These ranges may be realized in embodiments without or with an electrically or electrochemically rechargeable antimicrobial agent.

In some antimicrobial structures, the average phase-separation length is from about 0.5 microns to about 100 microns. In certain embodiments, the average phase-separation length is from about 1 micron to about 50 microns. In various embodiments, the average phase-separation length is from 100 nanometers to 100 microns, 100 nanometers to 500 microns, 100 nanometers to 100 microns, 100 nanometers to 200 microns, 100 nanometers to 200 microns, at least 200 nanometers, at least 500 nanometers, at least 1 micron, at least 5 microns, up to 10 microns, up to 50 microns, up to 100 microns, or up to 500 microns. Exemplary average phase-separation lengths are about, at least about, or at most about, 0.1, 0.2, 0.3, 0.4, 0.5, 1, 2, 3, 4, 5, 10, 15, 20, 25, 30, 40, 50, 60, 70, 80, 90, 100, 150, 200, 250, 300, 350, 400, 450, or 500 microns, including all intervening ranges.

The antimicrobial structure may be a coating or may be present in a coating. Alternatively, or additionally, the antimicrobial structure may be present at a surface of a bulk object. The antimicrobial structure may be the entirety of a bulk object, with no underlying substrate or other solid structure.

Various options may be incorporated into the antimicrobial structure, or a method of using the antimicrobial structure, to increase overall efficacy. For example, the antimicrobial structure may include physical features (e.g., nanorods or nanoporosity) that is of a similar length scale of viruses (e.g., about 50-150 nanometers) so that such physical features enhance the capture of viruses at the surface. The physical features may be fabricated from tethered quaternary ammonium compounds (see e.g., US 2019/0106525 which is incorporated by reference), alkyl chains, or curable polycations (e.g., polyethyleneimine), for example.

An ionic layer may be combined with a triggered exothermic component to add heat to the antimicrobial structure. For example, $CaCl_2$ may be incorporated as a solid additive in the antimicrobial structure to react with water (such as derived from an infected person's aerosol). The heat generated increases the rate of transport of antimicrobial agent. For example, see Chin et al., "Stability of SARS-CoV-2 in different environmental conditions", *The Lancet Microbe*, e10, Apr. 2, 2020 (including supplemental content), which is incorporated by reference.

The continuous transport phase may be configured to solubilize viruses and/or bacteria to aid breaking up their outer surfaces. For example, detergent molecules may be included within the continuous transport phase. In certain embodiments, tethered alkyl chains or amphiphiles are added to the continuous transport phase. Tethered alkyl chains or amphiphiles function similar to detergent molecules and will help disrupt bacteria or viral membranes. In these or other embodiments, surfactants may be included within the continuous transport phase. Surfactants may be anionic, cationic, zwitterionic, or non-ionic surfactants.

The solid structural phase may be fabricated from, or include, an anti-fouling polymer to minimize the presence of dirt and debris (e.g., oil) and to make the surface easier to clean. An exemplary anti-fouling polymer is a segmented copolymer, further discussed below.

In some embodiments, an antimicrobial agent is incorporated into the continuous transport phase during synthesis of the antimicrobial structure. In certain embodiments, an antimicrobial agent is incorporated into the continuous transport phase following synthesis of the antimicrobial structure, such as by infiltrating a liquid containing the antimicrobial agent into the continuous transport phase, or by electrochemically creating the antimicrobial agent in situ using a voltage applied between electrodes, for example.

Some embodiments will now be further described in reference to the synthesis of the solid structural phase and the continuous transport phase, the preferred biphasic architecture, and the selective incorporation of an antimicrobial agent within the continuous transport phase.

Some embodiments are premised on the preferential incorporation of an antimicrobial agent within one phase of a multiphase polymer coating. The structure of a microphase-separated polymer network provides a reservoir for antimicrobial agents within the continuous phase.

As intended herein, "microphase-separated" means that the first and second solid materials (e.g., soft segments) are physically separated on a microphase-separation length scale from about 0.1 microns to about 500 microns.

Unless otherwise indicated, all references to "phases" in this patent application are in reference to solid phases or fluid phases. A "phase" is a region of space (forming a thermodynamic system), throughout which all physical properties of a material are essentially uniform. Examples of physical properties include density and chemical composition. A solid phase is a region of solid material that is chemically uniform and physically distinct from other regions of solid material (or any liquid or vapor materials that may be present). Solid phases are typically polymeric and may melt or at least undergo a glass transition at elevated temperatures. Reference to multiple solid phases in a composition or microstructure means that there are at least two distinct material phases that are solid, without forming a solid solution or homogeneous mixture.

In some embodiments, the antimicrobial agent is in a fluid. Preferably, the fluid is not solely in a vapor phase at 25° C., since vapor is susceptible to leaking from the structure. However, the fluid may contain vapor in equilibrium with liquid, at 25° C. Also, in certain embodiments, a fluid is in liquid form at 25° C. but at least partially in vapor form at a higher use temperature, such as 30° C., 40° C., 50° C., or higher.

By a liquid being "disposed in" a solid material, it is meant that the liquid is incorporated into the bulk phase of the solid material, and/or onto surfaces of particles of the solid material. The liquid will be in close physical proximity with the solid material, intimately and/or adjacently. The disposition is meant to include various mechanisms of chemical or physical incorporation, including but not limited to, chemical or physical absorption, chemical or physical adsorption, chemical bonding, ion exchange, or reactive inclusion (which may convert at least some of the liquid into another component or a different phase, including potentially a solid). Also, a liquid disposed in a solid material may or may not be in thermodynamic equilibrium with the local composition or the environment. Liquids may or may not be permanently contained in the structure; for example, depending on volatility or other factors, some liquid may be lost to the environment over time.

By "selectively" disposed in the continuous transport phase, or the "selectivity" into the continuous transport phase, it is meant that of the antimicrobial agent that is disposed within the structure overall, at least 51%, preferably at least 75%, and more preferably at least 90% of the antimicrobial agent is disposed in only the continuous transport phase. In various embodiments, the selectivity into the continuous transport phase is about, or at least about, 60%, 65%, 70%, 75%, 80%, 85%, 90%, 95%, 99%, or 100%.

In some embodiments, a liquid is added to a polymer such as by submerging and soaking into the polymer. In these embodiments, the liquid may be absorbed into a solid polymer. In certain embodiments, the liquid absorption swells a polymer, which means that there is an increase of volume of polymer due to absorption of the liquid. The liquid may be, but does not need to be, classified as a solvent for the solid polymer which it swells.

The phase-separated microstructure preferably includes discrete islands of one material (the solid structural phase) within a continuous sea of the other material (the continuous transport phase). The continuous phase provides unbroken channels within the material for transport of mass and/or electrical charge.

In some embodiments, there are both phase-separated inclusions of the same chemical material, as well as physically and chemically distinct materials as additional inclusions.

The solid structural phase and the continuous transport phase may be present as phase-separated regions of a copolymer, such as a block copolymer. As intended herein, a "block copolymer" means a copolymer containing a linear arrangement of blocks, where each block is defined as a portion of a polymer molecule in which the monomeric units have at least one constitutional or configurational feature absent from the adjacent portions. Segmented block copolymers are preferred, providing two (or more) phases. An exemplary segmented copolymer is a urethane-urea copolymer. In some embodiments, a segmented polyurethane includes a microphase-separated structure of fluorinated and non-fluorinated species.

In some embodiments, a segmented copolymer is employed in which first soft segments form a continuous matrix and second soft segments are a plurality of discrete inclusions. In other embodiments, the first soft segments are a plurality of discrete inclusions and the second soft segments form a continuous matrix.

Segmented copolymers are typically created by combining a flexible oligomeric soft segment terminated with an alcohol or amine reactive groups and a multifunctional isocyanate. When the isocyanate is provided in excess relative to the alcohol/amine reactive groups, a viscous prepolymer mixture with a known chain length distribution is formed. This can then be cured to a high-molecular-weight network through the addition of amine or alcohol reactive groups to bring the ratio of isocyanate to amine/alcohol groups to unity. The product of this reaction is a chain backbone with alternating segments: soft segments of flexible oligomers and hard segments of the reaction product of low-molecular-weight isocyanates and alcohol/amines.

Due to the chemical immiscibility of these two phases, the material typically phase-separates on the length scale of these individual molecular blocks, thereby creating a microstructure of flexible regions adjacent to rigid segments strongly associated through hydrogen bonding of the urethane/urea moieties. This combination of flexible and associated elements typically produces a physically crosslinked elastomeric material.

Some variations of the invention utilize a segmented copolymer composition comprising:
(a) one or more first soft segments selected from fluoropolymers having an average molecular weight from about 500 g/mol to about 20,000 g/mol, wherein the fluoropolymers are ($\alpha,\omega$)-hydroxyl-terminated, ($\alpha,\omega$)-amine-terminated, and/or ($\alpha,\omega$)-thiol-terminated;
(b) one or more second soft segments selected from polyesters or polyethers, wherein the polyesters or polyethers are ($\alpha,\omega$)-hydroxyl-terminated, ($\alpha,\omega$)-amine-terminated, and/or ($\alpha,\omega$)-thiol-terminated;
(c) one or more isocyanate species possessing an isocyanate functionality of 2 or greater, or a reacted form thereof;
(d) one or more polyol or polyamine chain extenders or crosslinkers, or a reacted form thereof,
wherein the first soft segments and the second soft segments may (in some embodiments) be microphase-separated on a microphase-separation length scale from about 0.1 microns to about 500 microns, and
wherein optionally the molar ratio of the second soft segments to the first soft segments is less than 2.0.

In some embodiments, fluoropolymers are present in the triblock structure:

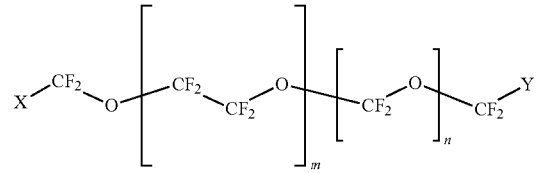

wherein:
X, Y=CH$_2$—(O—CH$_2$—CH$_2$)$_p$-T, and X and Y are independently selected;
p=1 to 50;
T is a hydroxyl, amine, or thiol terminal group;
m=0 to 100 (in some embodiments, m=1 to 100); and
n=0 to 100 (in some embodiments, n=1 to 100).

In some embodiments, the continuous transport phase includes a polyelectrolyte and a counterion to the polyelectrolyte. The polyelectrolyte may be selected from the group consisting of poly(acrylic acid) or copolymers thereof, cellulose-based polymers, carboxymethyl cellulose, chitosan, poly(styrene sulfonate) or copolymers thereof, poly(acrylic acid) or copolymers thereof, poly(methacrylic acid) or copolymers thereof, poly(allylamine), and combinations thereof, for example. The counterion may be selected from the group consisting of H$^+$, Li$^+$, Na$^+$, K$^+$, Ag$^+$, Ca$^{2+}$, Mg$^{2+}$, La$^{3+}$, C$_{16}$N$^+$, F$^-$, Cl$^-$, Br$^-$, I$^-$, BF$_4^-$, SO$_4^{2-}$, PO$_4^{2-}$, C$_{12}$SO$_3^-$, and combinations thereof, for example.

Other ionic species, combined with counterions, may be employed as well in the continuous transport phase. Generally, in some embodiments, ionic species may be selected from the group consisting of an ionizable salt, an ionizable molecule, a zwitterionic component, a polyelectrolyte, an ionomer, and combinations thereof.

An "ionomer" is a polymer composed of ionomer molecules. An "ionomer molecule" is a macromolecule in which a significant (e.g., greater than 1, 2, 5, 10, 15, 20, or 25 mol %) proportion of the constitutional units have ionizable or ionic groups, or both.

The classification of a polymer as an ionomer versus polyelectrolyte depends on the level of substitution of ionic groups as well as how the ionic groups are incorporated into the polymer structure. For example, polyelectrolytes also have ionic groups covalently bonded to the polymer backbone, but have a higher ionic group molar substitution level (such as greater than 50 mol %, usually greater than 80 mol %). Polyelectrolytes are polymers whose repeating units bear an electrolyte group. Polyelectrolyte properties are thus similar to both electrolytes (salts) and polymers. Like salts, their solutions are electrically conductive. Like polymers, their solutions are often viscous.

In some embodiments, the continuous transport phase includes a polymer such as a polyurethane, a polyurea, a polysiloxane, or a combination thereof, with at least some charge along the polymer backbone. Polymer charge may be achieved through the incorporation of ionic monomers such as dimethylolpropionic acid, or another ionic species. The degree of polymer charge may vary, such as about, or at least about, 1, 2, 5, 10, 15, 20, or 25 mol % of the polymer repeat units being ionic repeat units.

In some embodiments, the continuous transport phase includes an ionic species selected from the group consisting of (2,2-bis-(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3$\lambda^4$imidazol-1-ium bromide, 2,2-bis (hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl) propionic acid, 1,4-bis(2-hydroxyethyl)piperazine, 2,6-diaminocaproic acid, N,N-bis(2-hydroxyethyl)glycine, 2-hydroxypropanoic acid hemicalcium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis (2-hydroxypropyl) aniline, and homologues, combinations, derivatives, or reaction products thereof.

A liquid may be introduced into the continuous transport phase actively, passively, or a combination thereof. In some embodiments, a liquid is actively introduced to the continuous transport phase by spraying of the liquid, deposition from a vapor phase derived from the liquid, liquid injection, bath immersion, or other techniques. In some embodiments, a liquid is passively introduced to the continuous transport phase by letting the liquid naturally be extracted from the normal atmosphere, or from a local atmosphere adjusted to contain one or more desired liquids in vapor or droplet (e.g., mist) form.

In certain embodiments, a desired additive is normally a solid at room temperature and is first dissolved or suspended in a liquid that is then disposed in the continuous transport phase.

In other certain embodiments, a desired additive is normally a solid at room temperature and is first melted to produce a liquid that is then disposed in the continuous transport phase. Within the continuous transport phase, the desired additive may partially or completely solidify back to a solid, or may form a multiphase material, for example.

Some potential additives contain reactive groups that unintentionally react with chemical groups contained in the polymer precursors. Therefore, in some cases, there exists an incompatibility of liquid species in the resin during chemical synthesis and polymerization. Addition of reactive fluid additives into the reaction mixture during synthesis can dramatically alter stoichiometry and backbone structure, while modifying physical and mechanical properties. One strategy to circumvent this problem is to block the reactive groups (e.g., alcohols, amines, and/or thiols) in the fluid additive with chemical protecting groups to render them inert to reaction with other reactive chemical groups (e.g., isocyanates) in the coating precursors.

In particular, it is possible to temporarily block a reactive position by transforming it into a new functional group that will not interfere with the desired transformation. That blocking group is conventionally called a "protecting group." Incorporating a protecting group into a synthesis requires at least two chemical reactions. The first reaction transforms the interfering functional group into a different one that will not compete with (or compete at a lower reaction rate with) the desired reaction. This step is called protection. The second chemical step transforms the protecting group back into the original group at a later stage of synthesis. This latter step is called deprotection.

In some embodiments in which an additive contains alcohol, amine, and/or thiol groups, the additive thus contains chemical protecting groups to prevent or inhibit reaction of the alcohol, amine, and/or thiol groups with isocyanates. The protecting groups may be designed to undergo deprotection upon reaction with atmospheric moisture, for example.

In the case of an additive containing alcohol groups, the protecting groups may be selected from the silyl ether class of alcohol protecting groups. For example, the protecting groups may be selected from the group consisting of trimethylsilyl ether, isopropyldimethylsilyl ether, tert-butyldimethylsilyl ether, tert-butyldiphenylsilyl ether, tribenzylsilyl ether, triisopropylsilyl ether, and combinations thereof. In these or other embodiments, the protecting groups to protect alcohol may be selected from the group consisting of 2,2,2-trichloroethyl carbonate, 2-methoxyethoxymethyl ether, 2-naphthylmethyl ether, 4-methoxybenzyl ether, acetate, benzoate, benzyl ether, benzyloxymethyl acetal, ethoxyethyl acetal, methoxymethyl acetal, methoxypropyl acetal, methyl ether, tetrahydropyranyl acetal, triethylsilyl ether, and combinations thereof.

In the case of an additive containing amine groups, the protecting groups may be selected from the carbamate class of amine protecting groups, such as (but not limited to) vinyl carbamate. Alternatively, or additionally, the protecting groups may be selected from the ketamine class of amine protecting groups. In these or other embodiments, the protecting groups to protect amine may be selected from the group consisting of 1-chloroethyl carbamate, 4-methoxybenzenesulfonamide, acetamide, benzylamine, benzyloxy carbamate, formamide, methyl carbamate, trifluoroacetamide, tert-butoxy carbamate, and combinations thereof.

In the case of an additive containing thiol groups, the protecting groups may be selected from S-2,4-dinitrophenyl thioether and/or S-2-nitro-1-phenylethyl thioether, for example.

The typical reaction mechanism when water is the deprotecting reagent is simple hydrolysis. Water is often nucleophilic enough to kick off a leaving group and deprotect a species. One example of this is the protection of an amine with a ketone to form a ketamine. These can be mixed with isocyanates when the amine alone would react so quickly as to not be able to be practically mixed. Instead the ketamine reagent is inert but after mixing and casting as a film, atmospheric moisture will diffuse into the coating, remove the ketone (which vaporizes itself) and leaves the amine to rapidly react with neighboring isocyanates in situ.

Many deprotecting agents require high pH, low pH, or redox chemistry to work. However, some protecting groups are labile enough that water alone is sufficient to cause deprotection. When possible, a preferred strategy to spontaneously deprotect the molecules is through reaction with atmospheric moisture, such as an atmosphere containing from about 10% to about 90% relative humidity at ambient temperature and pressure. A well-known example is the room-temperature vulcanization of silicones. These systems have silyl ethers that are deprotected with moisture and in doing so the free Si—OH reacts with other silyl ethers to create Si—O—Si covalent bonds, forming a network.

In other embodiments, a chemical deprotection step is actively conducted, such as by introducing a deprotection agent and/or adjusting mixture conditions such as temperature, pressure, pH, solvents, electromagnetic field, or other parameters.

This specification hereby incorporates by reference herein Greene and Wuts, *Protective Groups in Organic Synthesis*, Fourth Edition, John Wiley & Sons, New York, 2007, for its teachings of the role of protecting groups, synthesis of protecting groups, and deprotection schemes including for example adjustment of pH by addition of acids or bases, to cause deprotection.

As intended in this patent application, "hygroscopic" means that a material is capable of attracting and holding water molecules from the surrounding environment. The water uptake of various polymers is described in Thijs et al., "Water uptake of hydrophilic polymers determined by a thermal gravimetric analyzer with a controlled humidity chamber" *J. Mater. Chem.*, (17) 2007, 4864-4871, which is hereby incorporated by reference herein. In some embodiments, a hygroscopic material is characterized by a water absorption capacity, at 90% relative humidity and 30° C., of at least 5, 10, 15, 20, 25, 30, 35, 40, 45, or 50 wt % uptake of $H_2O$.

In some embodiments employing segmented copolymers, one of the first soft segments and second soft segments is oleophobic. An oleophobic material has a poor affinity for oils. As intended herein, the term "oleophobic" means a material with a contact angle of hexadecane greater than 90°. An oleophobic material may also be classified as lipophobic.

In some embodiments employing segmented copolymers, one of the first soft segments and the second soft segments may be a "low-surface-energy polymer" which means a polymer, or a polymer-containing material, with a surface energy of no greater than 50 $mJ/m^2$. In some embodiments, one of the first soft segments and the second soft segments has a surface energy from about 5 $mJ/m^2$ to about 50 $mJ/m^2$.

In some embodiments employing segmented copolymers, the first soft segments or the second soft segments may be or include a fluoropolymer, such as (but not limited to) a fluoropolymer selected from the group consisting of polyfluoroethers, perfluoropolyethers, fluoroacrylates, fluorosilicones, polytetrafluoroethylene (PTFE), polyvinylidene difluoride (PVDF), polyvinylfluoride (PVF), polychlorotrifluoroethylene (PCTFE), copolymers of ethylene and trifluoroethylene, copolymers of ethylene and chlorotrifluoroethylene, and combinations thereof.

In these or other embodiments, the first soft segments or the second soft segments may be or include a siloxane. A siloxane contains at least one Si—O—Si linkage. The siloxane may consist of polymerized siloxanes or polysiloxanes (also known as silicones). One example is polydimethylsiloxane.

In some embodiments, the molar ratio of the second soft segments to the first soft segments is about 2.0 or less. In various embodiments, the molar ratio of the second soft segments to the first soft segments is about 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 1.95.

It is noted that ($\alpha,\omega$)-terminated polymers are terminated at each end of the polymer. The $\alpha$-termination may be the same or different than the $\omega$-termination on the opposite end. The fluoropolymers and/or the polyesters or polyethers may terminated with a combination of hydroxyl groups, amine groups, and thiol groups, among other possible termination groups. Note that thiols can react with an —NCO group (usually catalyzed by tertiary amines) to generate a thiourethane.

Also it is noted that in this disclosure, "($\alpha,\omega$)-termination" includes branching at the ends, so that the number of terminations may be greater than 2 per polymer molecule. The polymers herein may be linear or branched, and there may be various terminations and functional groups within the polymer chain, besides the end ($\alpha,\omega$) terminations.

In this description, "polyurethane" is a polymer comprising a chain of organic units joined by carbamate (urethane) links, where "urethane" refers to N(H)—(C=O)—O—. Polyurethanes are generally produced by reacting an isocyanate containing two or more isocyanate groups per molecule with one or more polyols containing on average two or more hydroxyl groups per molecule, in the presence of a catalyst.

Polyols are polymers with on average two or more hydroxyl groups per molecule. For example, $\alpha,\omega$-hydroxyl-terminated perfluoropolyether is a type of polyol.

"Isocyanate" is the functional group with the formula —N=C=O. For the purposes of this disclosure, O—C(=O)—N(H)—R is considered a derivative of isocyanate. "Isocyanate functionality" refers to the number of isocyanate reactive sites on a molecule. For example, diisocyanates have two isocyanate reactive sites and therefore an isocyanate functionality of 2. Triisocyanates have three isocyanate reactive sites and therefore an isocyanate functionality of 3.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C=O)—N(H)—. Polyureas are generally produced by reacting an isocyanate containing two or more isocyanate groups per molecule with one or more multifunctional amines (e.g., diamines) containing on average two or more amine groups per molecule, optionally in the presence of a catalyst.

A "chain extender or crosslinker" is a compound (or mixture of compounds) that link long molecules together and thereby complete a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. Chain extenders or crosslinkers can have an average functionality greater than 2 (such as 2.5, 3.0, or greater), i.e. beyond diols or diamines.

In some embodiments, polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extender or crosslinker possesses a functionality of 2 or greater, in some embodiments. At least one polyol or polyamine chain extender or crosslinker may be selected from the group consisting of 1,4-butanediol, 1,3-propanediol, 1,2-ethanediol, glycerol, trimethylolpropane, ethylenediamine, isophoronediamine, diaminocyclohexane, and homologues, derivatives, or combinations thereof. In some embodiments, polymeric forms of polyol chain extenders or crosslinkers are utilized, typically hydrocarbon or acrylic backbones with hydroxyl groups distributed along the side groups.

The one or more chain extenders or crosslinkers (or reaction products thereof) may be present in a concentration, in the segmented copolymer composition, from about 0.01 wt % to about 25 wt %, such as from about 0.05 wt % to about 10 wt %.

First soft segments may be present in a concentration from about 5 wt % to about 95 wt % based on total weight of the composition. In various embodiments, the first soft segments may be present in a concentration of about 5, 10, 20, 30, 40, 50, 60, 70, 80, 90, or 95 wt % based on total weight of the composition. Second soft segments may be present in a concentration from about 5 wt % to about 95 wt % based on total weight of the composition. In various embodiments, the second soft segments may be present in a concentration of about 5, 10, 20, 30, 40, 50, 60, 70, 80, 90, or 95 wt % based on total weight of the composition.

In some embodiments, fluorinated polyurethane oligomers are terminated with silane groups. The end groups on the oligomers (in the prepolymer) may be modified from isocyanate to silyl ethers. This can be accomplished through reaction of an isocyanate-reactive silane species (e.g., aminopropyltriethoxysilane) to provide hydrolysable groups well-known in silicon and siloxane chemistry. Such an approach eliminates the need for addition of a stoichiometric amount of curative to form strongly associative hard segments, while replacing the curative with species that possess the ability to form a covalently crosslinked network under the influence of moisture or heat. Such chemistry has been shown to preserve beneficial aspects of urethane coatings while boosting scratch resistance.

In addition, the reactivity of the terminal silane groups allows for additional functionality in the form of complimentary silanes blended with the prepolymer mixture. The silanes are able to condense into the hydrolysable network upon curing. This strategy allows for discrete domains of distinct composition. A specific embodiment relevant to anti-fouling involves the combination of fluoro-containing urethane prepolymer that is endcapped by silane reactive groups with additional alkyl silanes.

In some embodiments employing segmented copolymers, the microphase-separated microstructure containing the first and second soft segments may be characterized as an inhomogeneous microstructure. As intended in this patent application, "phase inhomogeneity," "inhomogeneous microstructure," and the like mean that a multiphase microstructure is present in which there are at least two discrete phases that are separated from each other. The two phases may be one discrete solid phase in a continuous solid phase, two co-continuous solid phases, or two discrete solid phases in a third continuous solid phase, for example. The length scale of phase inhomogeneity may refer to the average size (e.g., effective diameter) of discrete inclusions of one phase dispersed in a continuous phase. The length scale of phase inhomogeneity may refer to the average center-to-center distance between nearest-neighbor inclusions of the same phase. The length scale of phase inhomogeneity may alternatively refer to the average separation distance between nearest-neighbor regions of the discrete (e.g., droplets) phase, where the distance traverses the continuous phase.

The average length scale of phase inhomogeneity may generally be from about 0.1 microns to about 500 microns. In some embodiments, the average length scale of phase inhomogeneity is from about 0.5 microns to about 100 microns, such as about 1 micron to about 50 microns. In various embodiments, the average length scale of phase inhomogeneity is about 0.1, 0.2, 0.3, 0.4, 0.5, 0.6, 0.7, 0.8, 0.9, 1, 2, 3, 4, 5, 10, 15, 20, 25, 30, 35, 40, 45, 50, 60, 70, 80, 90, 100, 150, 200, 250, 300, 350, 400, 450, or 500 microns, including any intermediate values not explicitly recited, and ranges starting, ending, or encompassing such intermediate values. These are average values, noting that a portion of phase inhomogeneity may be present on a length scale less than 0.1 micron or greater than 500 microns (e.g., about 1000 microns), with the overall average falling in the range of 0.1-500 microns. Note that in this disclosure, "about 0.1 microns" is intended to encompass 0.05-0.149 microns (50-149 nanometers), i.e. ordinary rounding.

This phase inhomogeneity typically causes opaque coatings or films due to the scattering of light. Scattering of light including visible wavelengths in the bulk of a material is governed by changes in the index of refraction through the medium. Variations in refractive index at length scales near the wavelength of the propagating radiation will tend to scatter those wavelengths more effectively (Mie scattering), resulting in an opaque or white appearance for a coating. With visible light having a wavelength range of about 400-700 nm, a clear or transparent coating must typically keep variations in index of refraction below about 50 nm in length. As phase inhomogeneities increase in length scale, the opacity of the material rises. Phase inhomogeneities with average length scale from 0.1 μm to 500 μm are expected to drive significant scattering in the material, leading to opaque structures above 25 μm in thickness—unless the multiple phases happen to be refractive index-matched. See Althues et al., "Functional inorganic nanofillers for transparent polymers" *Chem. Soc. Rev.,* 2007, 36, 1454-1465, which is hereby incorporated by reference herein for its teaching that materials with inhomogeneity below 50 nm will tend to be clear, and materials with inhomogeneity above 50 nm (0.05 μm) will tend to be opaque.

In some embodiments, the antimicrobial structure is opaque with respect to ordinary light. In some embodiments, the antimicrobial structure is semi-transparent or transparent with respect to ordinary light. In certain embodiments, different phases of the antimicrobial structure are selected such that the respective refraction indices are matched or substantially similar. One example is polytetrahydrofuran with poly(ethylene glycol), which are index-matched to within about 1%. Another example is polytetrahydrofuran with poly(propylene glycol), which are index-matched to within about 2%. In some embodiments, the solid transport material and the solid structural material are selected such that the index of refraction of the solid structural material is within ±10%, preferably within ±5%, more preferably with ±2%, and most preferably with ±1%.

The antimicrobial structure may also be characterized by hierarchical phase separation. For example, when segmented copolymers are utilized, first soft segments and second soft segments—in addition to being microphase-separated—are typically nanophase-separated. As intended herein, two materials being "nanophase-separated" means that the two materials are separated from each other on a length scale from about 1 nanometer to about 100 nanometers. For example, the nanophase-separation length scale may be from about 10 nanometers to about 100 nanometers.

The nanophase separation between first solid material (or phase) and second solid material (or phase) may be caused by the presence of a third solid material (or phase) disposed between regions of the first and second solid materials. For example, in the case of first and second solid materials being soft segments of a segmented copolymer also with hard segments, the nanophase separation may be driven by intermolecular association of hydrogen-bonded, dense hard segments. In these cases, in some embodiments, the first soft segments and the hard segments are nanophase-separated on an average nanophase-separation length scale from about 10 nanometers to less than 100 nanometers. Alternatively, or additionally, the second soft segments and the hard segments may be nanophase-separated on an average nanophase-separation length scale from about 10 nanometers to less than 100 nanometers. The first and second soft segments themselves may also be nanophase-separated on an average nanophase-separation length scale from about 10 nanometers to less than 100 nanometers, i.e., the length scale of the individual polymer molecules.

The nanophase-separation length scale is hierarchically distinct from the microphase-separation length scale. With traditional phase separation in block copolymers, the blocks chemically segregate at the molecular level, resulting in regions of segregation on the length scale of the molecules, such as a nanophase-separation length scale from about 10 nanometers to about 100 nanometers. Again see Petrovic et al., "POLYURETHANE ELASTOMERS" Prog. Polym. Sci., Vol. 16, 695-836, 1991. The extreme difference of the two soft segments means that in the reaction pot the soft segments do not mix homogeneously and so create discrete region that are rich in fluoropolymer or rich in non-fluoropolymer (e.g., PEG) components, distinct from the molecular-level segregation. These emulsion droplets contain a large amount of polymer chains and are thus in the micron length-scale range. These length scales survive the curing process, so that the final material contains the microphase separation that was set-up from the emulsion, in addition to the molecular-level (nanoscale) segregation.

In some embodiments, therefore, the larger length scale of separation (0.1-500 microns) is driven by an emulsion process, which provides microphase separation that is in addition to classic molecular-level phase separation. Chen et al., "Structure and morphology of segmented polyurethanes: 2. Influence of reactant incompatibility" POLYMER, 1983, Vol. 24, pages 1333-1340, is hereby incorporated by reference herein for its teachings about microphase separation that can arise from an emulsion-based procedure.

In some embodiments, discrete inclusions have an average size (e.g., effective diameter) from about 50 nm to about 150 μm, such as from about 100 nm to about 100 μm. In various embodiments, discrete inclusions have an average size (e.g., effective diameter) of about 50 nm, 100 nm, 200 nm, 500 nm, 1 μm, 2 μm, 5 μm, 10 μm, 50 μm, 100 μm, or 200 μm.

In these or other embodiments, discrete inclusions (of solid structural phase) have an average center-to-center spacing between adjacent inclusions, through a continuous matrix (of continuous transport phase), from about 50 nm to about 150 μm, such as from about 100 nm to about 100 μm. In various embodiments, discrete inclusions have an average center-to-center spacing between adjacent inclusions of about 50 nm, 100 nm, 200 nm, 500 nm, 1 μm, 2 μm, 5 μm, 10 μm, 50 μm, 100 μm, or 200 μm.

In some variations of the invention, the antimicrobial structure forms a coating disposed on a substrate. The coating may have a thickness from about 1 μm to about 10 mm, for example. In various embodiments, the coating thickness is about 100 nm, 1 μm, 10 μm, 100 μm, 1 mm, or 10 mm. Thicker coatings provide the benefit that even after surface abrasion, the coating still functions because the entire depth of the coating (not just the outer surface) contains the functional materials. The coating thickness will generally depend on the specific application.

An optional substrate may be disposed on the back side of the antimicrobial structure. A substrate will be present when the material forms a coating or a portion of a coating (e.g., one layer of a multilayer coating). Many substrates are possible, such as a metal, polymer, wood, or glass substrate. Essentially, the substrate may be any material or object for which antimicrobial protection is desirable.

In some embodiments, an adhesion layer is disposed on a substrate, wherein the adhesion layer is configured to promote adhesion of the antimicrobial structure to the selected substrate. An adhesion layer contains one or more adhesion-promoting materials, such as (but not limited to) primers (e.g., carboxylated styrene-butadiene polymers), alkoxysilanes, zirconates, and titanium alkoxides.

Various strategies are possible to form the materials of the antimicrobial structure, as will be appreciated by a skilled artisan.

In some embodiments, the antimicrobial structure is in the form of an applique that may be adhered to a surface at the point of use.

Prior to formation of the final antimicrobial structure, a precursor composition may be provided. The precursor composition may be waterborne, solventborne, or a combination thereof. In some waterborne embodiments, first or second soft segments may be derived from an aqueous dispersion of a linear crosslinkable polyurethane containing charged groups, and the other soft segments may be derived from a crosslinking agent containing charged groups, for example.

In some embodiments, a precursor includes a silane, a silyl ether, a silanol, an alcohol, or a combination or reaction product thereof, and optionally further includes a protecting group that protects the precursor from reacting with other components.

Some embodiments employ waterborne polyurethane dispersions. A successful waterborne polyurethane dispersion sometimes requires the specific components to contain ionic groups to aid in stabilizing the emulsion. Other factors contributing to the formulation of a stable dispersion include the concentration of ionic groups, concentration of water or solvent, and rate of water addition and mixing during the inversion process. An isocyanate prepolymer may be dispersed in water. Subsequently, a curative component may be dispersed in water. Water evaporation then promotes the formation of a microphase-separated polyurethane material.

A composition or precursor composition may generally be formed from a precursor material (or combination of materials) that may be provided, obtained, or fabricated from starting components. The precursor material is capable of hardening or curing in some fashion, to form a precursor composition containing the first soft segments and second soft segments, microphase-separated on a microphase-separation length scale from about 0.1 microns to about 500 microns. The precursor material may be a liquid; a multiphase liquid; a multiphase slurry, emulsion, or suspension; a gel; or a dissolved solid (in solvent), for example.

In some embodiments, an emulsion sets up in the reaction mixture based on incompatibility between the two blocks (e.g., PEG and PFPE). The emulsion provides microphase separation in the precursor material. The precursor material is then cured from casting or spraying. The microphase separation survives the curing process (even if the length scales change somewhat during curing), providing the benefits in the final materials (or precursor compositions) as described herein. Without being limited by theory, the microphase separation in this invention is not associated with molecular length-scale separation (5-50 nm) that many classic block-copolymer systems exhibit. Rather, the larger length scales of microphase separation, i.e. 0.1-500 μm, arise from the emulsion that was set-up prior to curing.

Xu et al., "Structure and morphology of segmented polyurethanes: 1. Influence of incompatibility on hard-segment sequence length" POLYMER, 1983, Vol. 24, pages 1327-1332 and Chen et al., "Structure and morphology of segmented polyurethanes: 2. Influence of reactant incompatibility" POLYMER, 1983, Vol. 24, pages 1333-1340, are each hereby incorporated by reference herein for their teachings about emulsion set-up in polyurethane systems prior to curing.

In some variations of the invention, a precursor material is applied to a substrate and allowed to react, cure, or harden to form a final composition (e.g., coating). In some embodiments, a precursor material is prepared and then dispensed (deposited) over an area of interest. Any known methods to deposit precursor materials may be employed. A fluid precursor material allows for convenient dispensing using spray coating or casting techniques.

The fluid precursor material may be applied to a surface using any coating technique, such as (but not limited to) spray coating, dip coating, doctor-blade coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid precursor material may be rapidly sprayed or cast in thin layers over large areas (such as multiple square meters).

When a solvent or carrier fluid is present in a fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), acids (such as organic acids), bases, and any mixtures thereof. When a solvent or carrier fluid is present, it may be in a concentration of from about 10 wt % to about 99 wt % or higher, for example.

The precursor material may be converted to an intermediate material or the final composition using any one or more of curing or other chemical reactions, or separations such as removal of solvent or carrier fluid, monomer, water, or vapor. Curing refers to toughening or hardening of a polymeric material by physical crosslinking, covalent crosslinking, and/or covalent bonding of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

EXAMPLES

Example 1

Synthesis of Polymeric Antimicrobial Structure

Polyethylene glycol ($M_n$=400 g/mol, 9.88 g), fluoropolymer Fluorolink E10H ($M_n$=1800 g/mol, 10.0 g), polyisocyanate Desmodur 3300 (equivalent weight=193, 9.54 g) and dibutyltin dilaurate (2000 ppm) are combined in a polypropylene cup. Ratios of polyethylene glycol and fluoropolymer are adjusted to produce a 60 vol %/40 vol % ratio, respectively. This mixture is then and placed in a centrifugal mixer (2 min, 2000 rpm) and homogenized. The resin is then cast on biaxially-oriented polyethylene terephthalate (Mylar) with a release film using a doctor blade and left to cure at room temperature.

Example 2

Synthesis of Polymeric Antimicrobial Structure

Poly(tetramethylene glycol) ($M_n$=650 g/mol, 10.00 g) (also known as polyTHF or pTHF), polyethylene glycol ($M_n$=600 g/mol, 3.81 g) (also known as PEG), polyisocyanate Desmodur 3300 (equivalent weight=193, 8.39 g) and dibutyltin dilaurate (2000 ppm) are combined in a polypropylene cup. Ratios of poly(tetramethylene glycol) and polyethylene glycol are adjusted to produce a 75 vol %/25 vol % ratio, respectively. This mixture is then placed in a centrifugal mixer (2 min, 2000 rpm) and homogenized. The resin is then cast on Mylar with a release film using a doctor blade and left to cure at room temperature.

Example 3

Electrochemical Impedance Spectroscopy (EIS) of Antimicrobial Agent Transport in Polymer Films The transport rate of a selected antimicrobial agent (10% benzalkonium chloride in water) is measured in a series of PEG-polyTHF films using electrochemical impedance spectroscopy (EIS). The typical film surface area is 1.08 cm² with a thickness of about 0.02 cm. Measurements are performed in a two-electrode electrochemical cell at frequencies between $10^2$ and $5\times10^6$ Hz.

Figure 4:
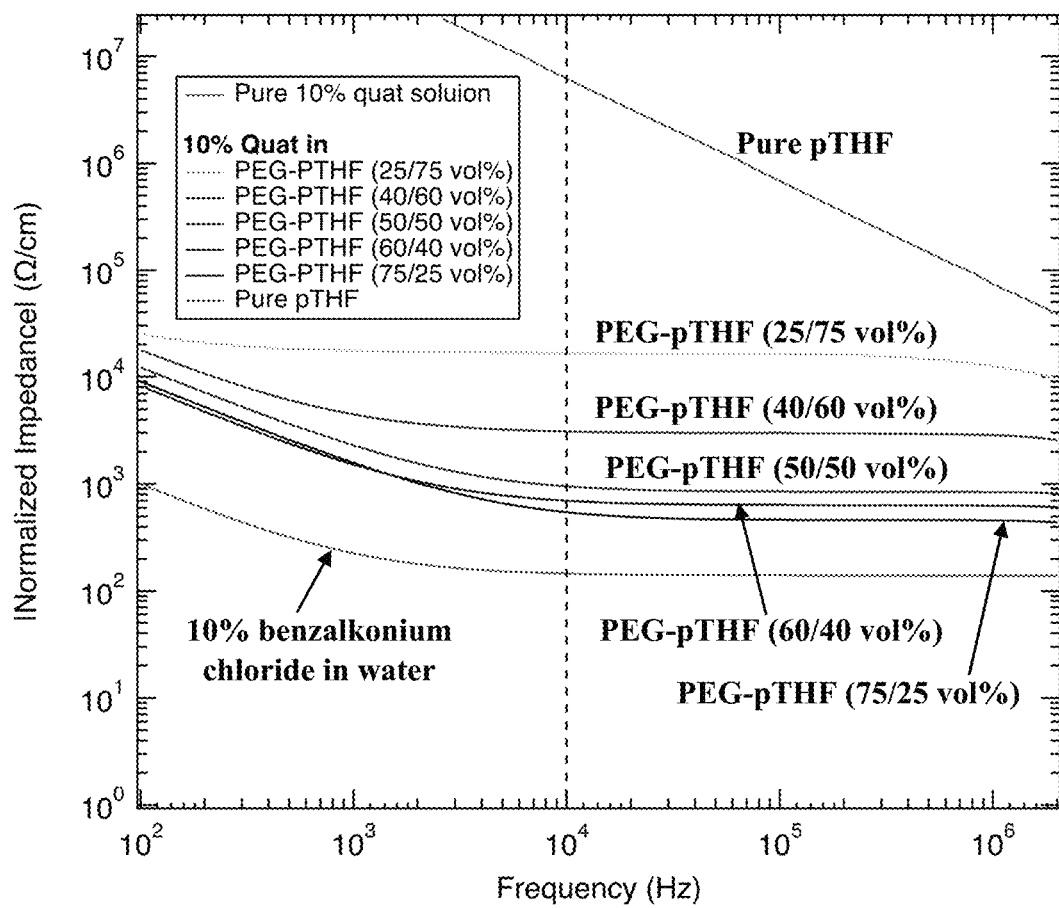
FIG. 4 shows the magnitude of impedance for six poly (ethylene glycol)-polyTHF films with various PEG concentrations after immersion in a 10% benzalkonium chloride solution, in Example 3.

FIG. 4 shows the magnitude of the impedance spectra (normalized by the film thickness) for six films with various PEG concentrations (0 vol %, 25 vol %, 40 vol %, 50 vol %, 60 vol %, and 75 vol % PEG, with the remainder pTHF)

after immersion in a 10% benzalkonium chloride (in water) solution for approximately 2 days. As a comparison, the normalized impedance spectra for a pure solution of 10% benzalkonium chloride in water is also shown. In FIG. 4, "quat" refers to 10% benzalkonium chloride. Specific conductivity and diffusion coefficients are measured from the impedance at $10^4$ Hz (dashed vertical line in FIG. 4).

Figure 5:
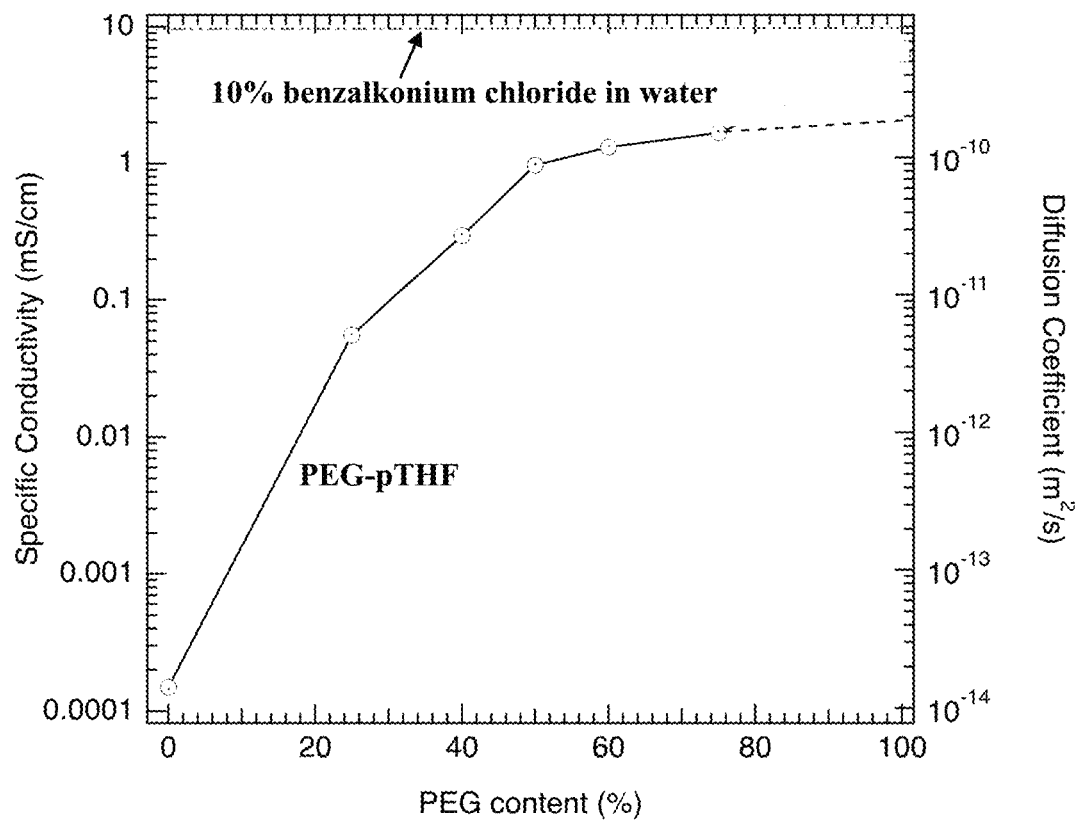
FIG. 5 shows a plot of specific conductivity and diffusion coefficients of poly(ethylene glycol)-polyTHF films as a function of PEG concentration after immersion in a 10% benzalkonium chloride solution, in Example 3.

FIG. 5 shows a plot of the specific conductivity (left axis) and diffusion coefficients (right axis) as a function of PEG concentration (0 vol %, 25 vol %, 40 vol %, 50 vol %, 60 vol %, and 75 vol %) after immersion in a 10% benzalkonium chloride (in water) solution for approximately 2 days. Conductivity and diffusion coefficients are determined from the impedance at 10 kHz. The dashed near at the top of FIG. 5 represents the conductivity and diffusion coefficient of a pure solution of 10% benzalkonium chloride in water.

The specific conductivity of the benzalkonium chloride in the film with 25 vol % PEG is about 400× greater than that of the pure pTHF film. This measurement suggests a small amount of a transport phase (e.g., PEG) is sufficient to achieve rapid transport of benzalkonium chloride in these films. The transport rate of the benzalkonium chloride (the conductivity) increase with PEG concentration, increasing an additional 30× at 75 vol % PEG.

Example 4

Use of Antimicrobial Structure

This example illustrates one antimicrobial structure and one commercial method of using the antimicrobial structure. The structure and method of using it are not intended to limit the scope of the invention in any way.

An antimicrobial structure is fabricated with a discrete solid structural phase of perfluoropolyethers, a continuous transport phase of poly(ethylene oxide) and optionally polyacrylic acid and/or 2-phenoxyethanol electrolytes, a trifunctional isocyanate as crosslinking agent to lock in the network structure, and quaternary ammonium biocides as the antimicrobial agent.

A shared vehicle such as a taxi incorporates a disclosed antimicrobial structure as a seat coating. A first occupant enters the vehicle and, in the process of entering, removes a portion of the antimicrobial agent at that surface. Less than an hour later, a second occupant coughs and deposits an amount of active virus onto the seat surface. The seat surface was quickly and automatically replenished of antimicrobial agent (quaternary ammonium biocides) according to the principles set forth in this disclosure, due to fast transport from the continuous transport phase. The antimicrobial agent inactivates the virus from the second occupant. Less than an hour later, a third occupant enters the same shared vehicle and touches the same surface, but the third occupant does not become infected since the viral load at the seat surface has been reduced to very low levels that are no longer infectious to humans.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An antimicrobial structure comprising:
   (a) a solid structural phase comprising a solid structural material, wherein said solid structural material is a solid structural polymer selected from the group consisting of a non-fluorinated carbon-based polymer, a silicone, a fluorinated polymer, and combinations thereof;
   (b) a continuous transport phase that is interspersed within said solid structural phase, wherein said continuous transport phase comprises a solid transport material, and wherein said continuous transport phase contains an antimicrobial agent and a transport-phase liquid that at least partially dissolves said antimicrobial agent; and
   (c) first and second electrodes,
   wherein said antimicrobial agent is electrically or electrochemically rechargeable when a voltage is applied between said first and second electrodes,
   and wherein said solid structural phase and said continuous transport phase are separated by an average phase-separation length from about 100 nanometers to about 500 microns.

2. The antimicrobial structure of claim 1, wherein said first and second electrodes are embedded within said antimicrobial structure.

3. The antimicrobial structure of claim 1, wherein at least one of said first and second electrodes is an outer layer disposed on said antimicrobial structure.

4. The antimicrobial structure of claim 1, wherein said first electrode is a first outer layer disposed on said antimicrobial structure, and wherein said second electrode is a second outer layer disposed on said antimicrobial structure.

5. The antimicrobial structure of claim 1, wherein one of said first and second electrodes is integrated with a base substrate or a wall.

6. The antimicrobial structure of claim 1, wherein at least one of said first and second electrodes has a non-planar electrode architecture.

7. The antimicrobial structure of claim 1, wherein said electrodes are fabricated from metal grids, meshes, or perforated plates.

8. The antimicrobial structure of claim 1, wherein said electrodes contain a catalyst.

9. The antimicrobial structure of claim 8, wherein said catalyst is selected from the group consisting of Ti, Pt, Ru, Ir, and combinations thereof.

10. The antimicrobial structure of claim 1, wherein said non-fluorinated carbon-based polymers are selected from the group consisting of polyalkanes, polyurethanes, polyethers, polyureas, polyesters, and combinations thereof.

11. The antimicrobial structure of claim 1, wherein said silicones are selected from the group consisting of polydimethyl siloxane, polytrifluoropropylmethyl siloxane, polyaminopropylmethyl siloxane, polyaminoethylaminopropylmethyl siloxane, polyaminoethylaminoisobutylmethyl siloxane, and combinations thereof.

12. The antimicrobial structure of claim 1, wherein said fluorinated polymers are selected from the group consisting of fluorinated polyols, perfluorocarbons, perfluoropolyethers, polyfluoroacrylates, polyfluorosiloxanes, polyvinylidene fluoride, polytrifluoroethylene, and combinations thereof.

13. The antimicrobial structure of claim 1, wherein said solid transport material includes a hygroscopic solid transport polymer selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), modified cellulosic polymers, carboxymethyl cellulose, hydroxyethyl cellulose, hydroxypropyl cellulose, methyl cellulose, and combinations thereof.

14. The antimicrobial structure of claim 1, wherein said solid transport material includes a hydrophobic, non-lipophobic solid transport polymer selected from the group consisting of poly(propylene glycol), poly(tetramethylene glycol), polybutadiene, polycarbonate, polycaprolactone, acrylic polyols, and combinations thereof.

15. The antimicrobial structure of claim 1, wherein said solid transport material includes a hydrophilic solid transport polymer with ionic charge, and wherein said ionic charge is present within said hydrophilic solid transport polymer as carboxylate groups, amine groups, sulfate groups, or phosphate groups.

16. The antimicrobial structure of claim 1, wherein said solid transport material includes an electrolyte solid transport polymer selected from the group consisting of polyethylene oxide, polypropylene oxide, polycarbonates, polysiloxanes, polyvinylidene difluoride, and combinations thereof.

17. The antimicrobial structure of claim 1, wherein said solid structural material is a solid structural polymer, wherein said solid transport material is a solid transport polymer, and wherein said solid structural polymer is crosslinked, via a crosslinking molecule, with said solid transport polymer.

18. The antimicrobial structure of claim 17, wherein said crosslinking molecule includes at least one moiety selected from the group consisting of an amine moiety, a hydroxyl moiety, an isocyanate moiety, and a combination thereof.

19. The antimicrobial structure of claim 1, wherein said transport-phase liquid is water.

20. The antimicrobial structure of claim 1, wherein said antimicrobial agent is sodium hypochlorite and/or hypochlorous acid.

21. The antimicrobial structure of claim 1, wherein said antimicrobial agent is hydrogen peroxide.

22. The antimicrobial structure of claim 1, wherein said antimicrobial agent is selected from N-halamines.

23. The antimicrobial structure of claim 1, wherein said antimicrobial structure is characterized in that said antimicrobial agent has a diffusion coefficient between $10^{-16}$ m$^2$/s and $10^{-9}$ m$^2$/s, measured at 25° C. and 1 bar, within said continuous transport phase.

24. The antimicrobial structure of claim 1, wherein said antimicrobial structure further contains one or more protective layers.

25. The antimicrobial structure of claim 1, wherein said antimicrobial structure is a coating, is present in a coating, or is present at a surface of a bulk object.

26. A method of charging or recharging an antimicrobial structure with an antimicrobial agent, said method comprising:
(i) providing an antimicrobial structure comprising: a solid structural phase comprising a solid structural material, wherein said solid structural material is a solid structural polymer selected from the group consisting of a non-fluorinated carbon-based polymer, a silicone, a fluorinated polymer, and combinations thereof; a continuous transport phase that is interspersed within said solid structural phase, wherein said continuous transport phase comprises a solid transport material; and first and second electrodes;
(ii) introducing an antimicrobial agent precursor to said continuous transport phase; and
(iii) applying a voltage between said first and second electrodes, wherein said antimicrobial agent precursor is electrochemically converted to an antimicrobial agent within said continuous transport phase.

27. The method of claim 26, wherein said method initially charges said antimicrobial agent into said antimicrobial structure.

28. The method of claim 26, wherein said method recharges said antimicrobial agent into said antimicrobial structure after a period of use.

29. The method of claim 26, wherein in step (ii), said continuous transport phase is wet with a liquid solution containing said antimicrobial agent precursor and/or a liquid electrolyte containing said antimicrobial agent precursor.

30. The method of claim 26, wherein said antimicrobial agent precursor is sodium chloride, and wherein said antimicrobial agent is sodium hypochlorite and/or hypochlorous acid.

31. The method of claim 26, wherein said antimicrobial agent precursor is sodium hypochlorite and/or hypochlorous acid, and wherein said antimicrobial agent is selected from chlorine-containing N-halamines.

32. The method of claim 26, wherein said method further comprises washing or soaking said antimicrobial structure with a salt solution and/or a pH buffer.

33. The method of claim 26, wherein said solid structural phase and said continuous transport phase are separated by an average phase-separation length from about 100 nanometers to about 500 microns.

34. The method of claim 26, wherein said antimicrobial agent has a diffusion coefficient between $10^{-16}$ m$^2$/s and $10^{-9}$ m$^2$/s, measured at 25° C. and 1 bar, within said continuous transport phase.

35. The method of claim 26, wherein said first and second electrodes are embedded within said solid structural phase.

36. The method of claim 26, wherein at least one of said first and second electrodes is an outer layer disposed on said solid structural phase.

37. The method of claim 26, wherein said first electrode is a first outer layer disposed on said solid structural phase, and wherein said second electrode is a second outer layer disposed on said solid structural phase.

38. The method of claim 26, wherein one of said first and second electrodes is integrated with a base substrate or a wall.

39. The method of claim 26, wherein at least one of said first and second electrodes has a non-planar electrode architecture.

40. The antimicrobial structure of claim 1, wherein said antimicrobial structure further comprises a particulate filler.

41. The antimicrobial structure of claim 40, wherein said particulate filler is selected from the group consisting of silica, alumina, silicates, talc, aluminosilicates, barium sulfate, mica, diatomite, calcium carbonate, calcium sulfate, carbon, wollastonite, and combinations thereof.

42. The antimicrobial structure of claim 40, wherein said particulate filler is surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof.

* * * * *